United States Patent
Takizawa et al.

(10) Patent No.: US 7,463,317 B2
(45) Date of Patent: Dec. 9, 2008

(54) ELECTRO-OPTICAL DEVICE, COLOR FILTER SUBSTRATE WITH RELECTIVE AND TRANSMISSION REGIONS AND ELECTRONIC APPARATUS

(75) Inventors: Keiji Takizawa, Hotaka-machi (JP); Yoshihiro Otagiri, Matsumoto (JP)

(73) Assignee: Seiko Epson Corporation (JP)

( * ) Notice: Subject to any disclaimer, the term of this patent is extended or adjusted under 35 U.S.C. 154(b) by 14 days.

(21) Appl. No.: 10/206,784

(22) Filed: Jul. 26, 2002

(65) Prior Publication Data
US 2003/0025977 A1 Feb. 6, 2003

(30) Foreign Application Priority Data
Jul. 27, 2001 (JP) ............................. 2001-228447
Jun. 27, 2002 (JP) ............................. 2002-188602

(51) Int. Cl.
G02F 1/1335 (2006.01)

(52) U.S. Cl. .................. 349/114; 349/106; 349/113

(58) Field of Classification Search ............ 349/44, 349/114, 106, 113; 345/88
See application file for complete search history.

(56) References Cited

U.S. PATENT DOCUMENTS

| | | | |
|---|---|---|---|
| 5,757,452 A * | 5/1998 | Masaki et al. | 349/110 |
| 6,084,650 A * | 7/2000 | Sekiguchi | 349/106 |
| 6,122,027 A | 9/2000 | Ogawa et al. | |
| 6,124,909 A | 9/2000 | Miyashita et al. | |
| 6,147,728 A | 11/2000 | Okumura et al. | |
| 6,195,140 B1 | 2/2001 | Kubo et al. | |
| 6,215,538 B1 * | 4/2001 | Narutaki et al. | 349/106 |
| 6,271,907 B1 * | 8/2001 | Masaki et al. | 349/189 |
| 6,281,952 B1 | 8/2001 | Okamoto et al. | |
| 6,476,889 B2 | 11/2002 | Urabe et al. | |
| 6,501,521 B2 | 12/2002 | Matsushita et al. | |
| 6,563,559 B2 * | 5/2003 | Noritake | 349/113 |
| 6,768,533 B2 * | 7/2004 | Hanakawa et al. | 349/153 |
| 6,785,068 B2 * | 8/2004 | Takizawa et al. | 359/885 |
| 7,136,125 B2 | 11/2006 | Nakamura et al. | |
| 2001/0004276 A1 * | 6/2001 | Urabe et al. | 349/106 |

(Continued)

FOREIGN PATENT DOCUMENTS

JP 61-230101 10/1986

(Continued)

OTHER PUBLICATIONS

Communication from Japanese Patent Office regarding counterpart application.

(Continued)

*Primary Examiner*—David C. Nelms
*Assistant Examiner*—Hoan C Nguyen
(74) *Attorney, Agent, or Firm*—Harness, Dickey & Pierce, P.L.C.

(57) ABSTRACT

A reflective layer 212 having an aperture 212a for each pixel is formed on a first substrate 211, and a colored layer 214 for constituting a color filter is formed thereon. A surface protection layer 215 is formed on the colored layer 214, and a transparent electrode 216 is formed further thereon. The colored layer 214 is constituted so as to cover the aperture 212a in a two-dimensional direction, but overlaps only a part of a reflection surface in the pixel in a two-dimensional direction.

1 Claim, 16 Drawing Sheets

U.S. PATENT DOCUMENTS

| | | | |
|---|---|---|---|
| 2001/0008437 A1* | 7/2001 | Fujimori et al. | 349/113 |
| 2002/0044240 A1* | 4/2002 | Choo et al. | 349/113 |
| 2002/0130991 A1* | 9/2002 | Kamijo | 349/106 |

FOREIGN PATENT DOCUMENTS

| | | |
|---|---|---|
| JP | 01-259396 | 10/1989 |
| JP | 10-239681 | 9/1998 |
| JP | 11-52366 | 2/1999 |
| JP | 11-072779 | 3/1999 |
| JP | 11-072780 | 3/1999 |
| JP | 11-084365 | 3/1999 |
| JP | 11-101992 | 4/1999 |
| JP | 11-109331 | 4/1999 |
| JP | 11-109333 | 4/1999 |
| JP | 11-183891 | 7/1999 |
| JP | 11-183892 | 7/1999 |
| JP | 11-242226 | 9/1999 |
| JP | 11-305248 | 11/1999 |
| JP | 11-337931 | 12/1999 |
| JP | 2000-010117 | 1/2000 |
| JP | 2000-019563 | 1/2000 |
| JP | 2000-089248 | 3/2000 |
| JP | 2000-111902 | 4/2000 |
| JP | 2000-171830 | 6/2000 |
| JP | 2000-194286 | 7/2000 |
| JP | 2000-267081 | 9/2000 |
| JP | 2000267077 * | 9/2000 |
| JP | 2000-298271 A | 10/2000 |
| JP | 2001-108980 | 3/2001 |
| JP | 2001-125094 | 5/2001 |
| JP | 2001-166289 | 6/2001 |
| JP | 2001-221995 | 8/2001 |
| JP | 2003-121833 | 4/2003 |
| JP | 2003-215560 | 7/2003 |
| WO | WO 01 92950 | 12/2001 |

OTHER PUBLICATIONS

Communication from Korean Patent Office re: counterpart application.
Communication from Japanese Patent Office re: counterpart application No. 2002-188602.
Communication from European Patent Office regarding counterpart application.
Machine generated English translation for JP11-101992.
Machine generated English translation for JP2000-267081.
Machine generated English translation for JP2000-194286.
Machine generated English translation for JP2000-089248.
Machine generated English translation for JP11-337931.
Machine generated English translation for JP11-024226.
Machine generated English translation for JP11-305248.

* cited by examiner

FIG. 4
400
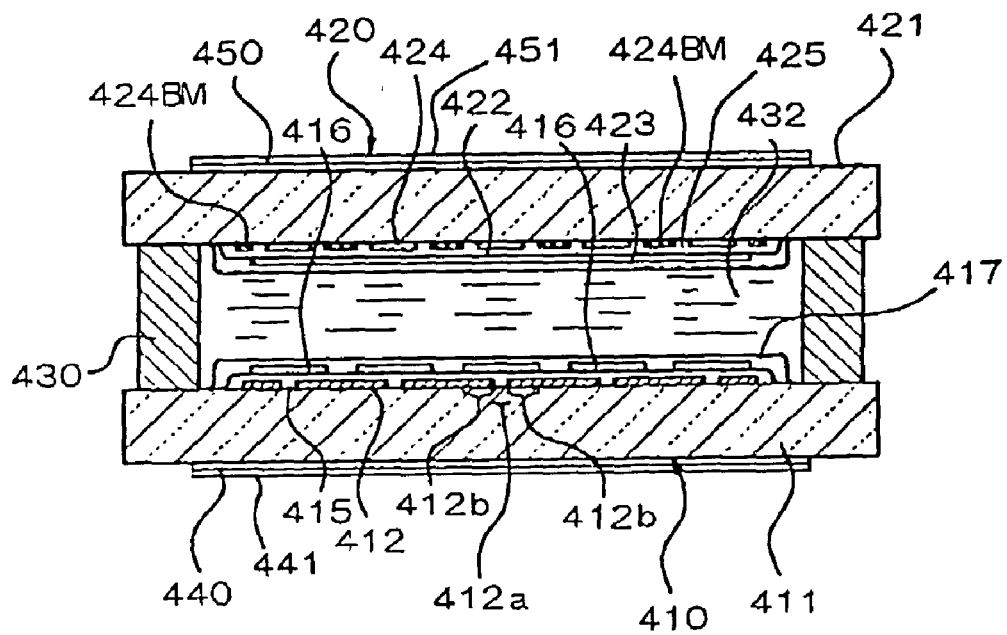
(a)
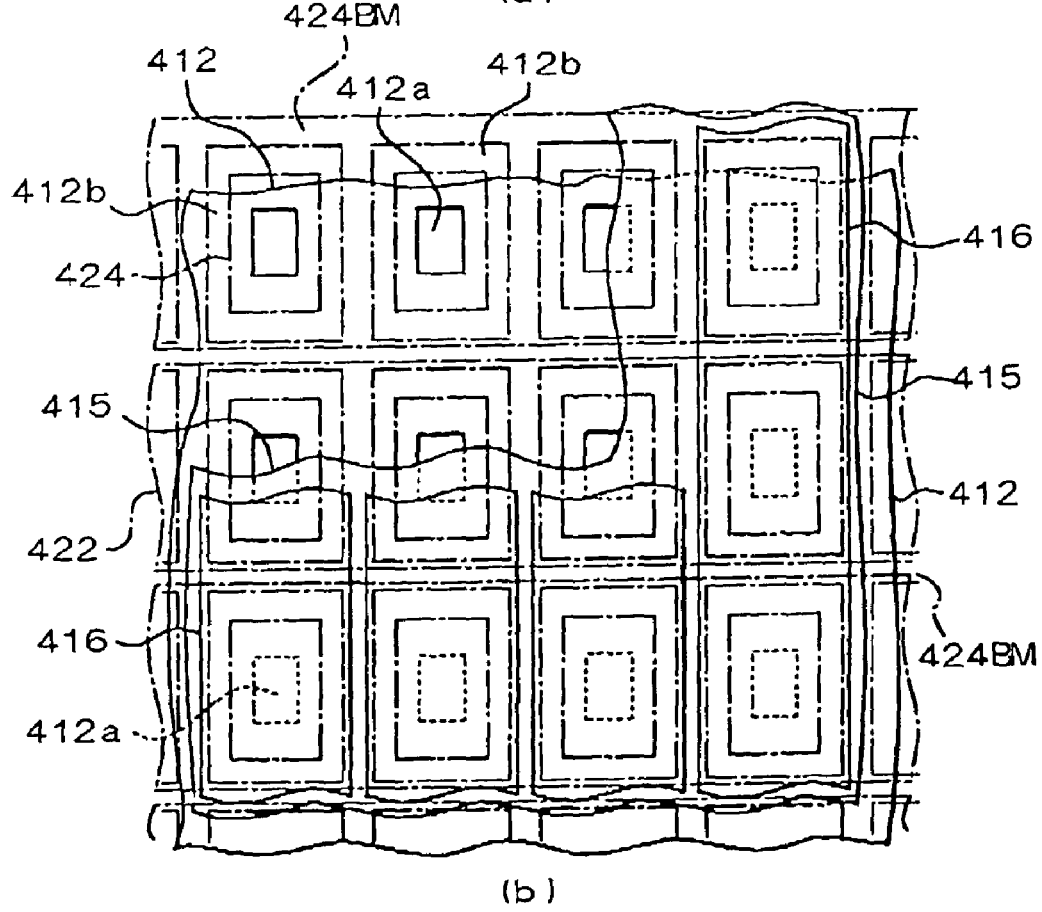
(b)

FIG. 17
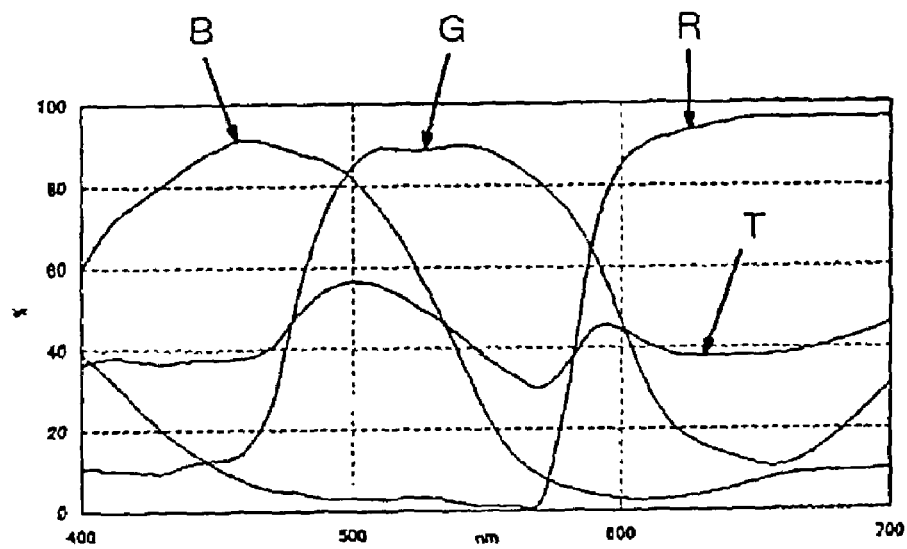
(a)
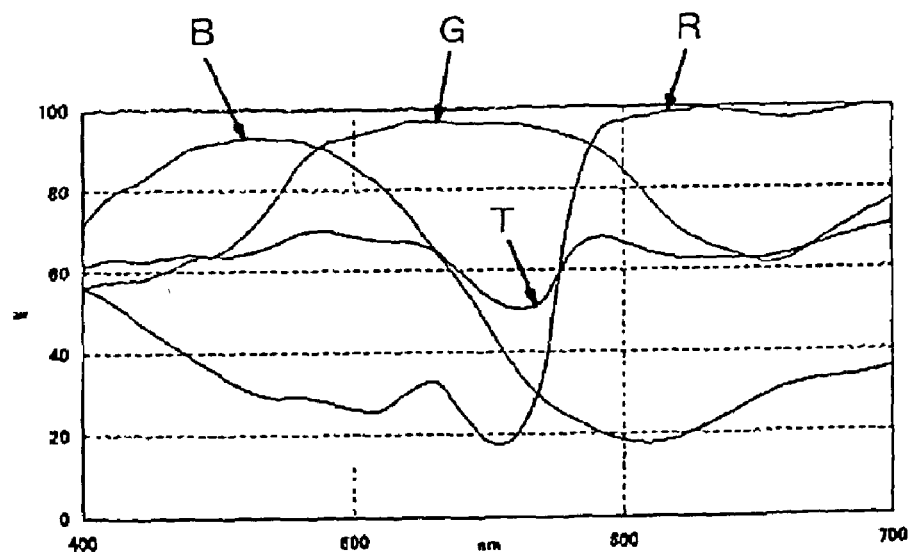
(b)

ELECTRO-OPTICAL DEVICE, COLOR FILTER SUBSTRATE WITH RELECTIVE AND TRANSMISSION REGIONS AND ELECTRONIC APPARATUS

BACKGROUND OF THE INVENTION

1. Technical Field of the Invention

The present invention relates to an electro-optical device, a color filter substrate and an electronic apparatus, and more specifically, it relates to a technology suitable for a structure of a color electro-optical device having a reflective layer.

2. Description of the Related Art

Transflective display type liquid crystal display panels capable of visually recognizing reflective display utilizing the external light and transmissive display utilizing illumination light such as a backlight have been known. This transflective display type liquid crystal display panel has a reflective layer for reflecting the external light in its panel so that the illumination light of the backlight can be transmitted through this reflective layer. This kind of the reflective layer includes one having an aperture (a slit) of a predetermined area for each pixel of the liquid crystal display panel.

FIG. 20 is a schematic sectional view schematically showing a diagrammatic structure of a conventional transflective display type liquid crystal display panel 100. This liquid crystal display panel 100 comprises a substrate 101 and a substrate 102 affixed to each other via sealing members 103, and has a structure with a liquid crystal 104 sealed between the substrate 101 and substrate 102.

A reflective layer 111 having an aperture 111a and a reflection part 111b for each pixel is formed on an inner surface of the substrate 101, and a color filter 112 having colored layers 112r, 112g and 112b, and a surface protection layer 112p is formed on this reflective layer 111. A transparent electrode 113 is formed on the surface of the surface protection layer 112p of the color filter 112.

On the other hand, a transparent electrode 121 is formed on an inner surface of the substrate 102 so as to be across the transparent electrode 113 on the substrate 101 facing thereto. An alignment layer, a hard transparent layer, etc. are appropriately formed on the substrate 101 and the substrate 102 as necessary.

On an outer surface of the substrate 102, a retardation film (a quarter wavelength plate) 105 and a polarizer 106 are successively disposed. On an outer surface of the substrate 101, a retardation film (a quarter wavelength plate) 107 and a polarizer 108 are successively disposed.

When the liquid crystal display panel 100 constituted as described above is installed in an electronic apparatus such as a cellular phone and a portable information terminal, a backlight 109 is fitted to a back side thereof. In this liquid crystal display panel 100, the external light is transmitted through the liquid crystal 104 along a reflection path R during the daytime or in a bright place indoors, and then, reflected by the reflection part 111b, and again transmitted through the liquid crystal 104 and emitted therefrom, allowing the reflective display to be visually recognized. On the other hand, during the nighttime or in a dark place outdoors, by lighting the backlight 109, the light transmitting through the aperture 111a out of the illumination light of the backlight 109 is transmitted through the liquid crystal display panel 100 along the transmission path T and emitted therefrom, allowing the transmissive display to be visually recognized.

However, in the conventional transflective display type liquid crystal display panel 100, the light is transmitted through the color filter 112 two times on the reflection path R while the light is transmitted through the color filter 112 only once on the transmission path T. Thus, brightness of the reflective display is degraded compared with brightness of the transmissive display. In addition, a problem occurs in that saturation in the transmissive display is degraded with respect to saturation of the reflective display. This means that, in the reflective display, display brightness is generally insufficient, and display brightness must be ensured by setting the light transmittance ratio of the color filter 112 to be high. However, in this configuration, sufficient saturation cannot be obtained in the transmissive display.

As described above, the number of transmission of the light through the color filter is different between the reflective display and the transmissive display, and thus, saturation of the reflective display is largely different from saturation of the transmissive display. A problem of sense of incongruity thus occurs.

The present invention is thus achieved to solve the above problems, and an object of the present invention is to provide a color filter substrate capable of ensuring both light ness of the reflective display and saturation of the transmissive display which used in a display device enabling both the reflective display and transmissive display. Another object is to provide a transflective display type electro-optical device capable of ensuring both brightness of the reflective display and saturation of the transmissive display. Still another object is to realize display technology capable of difference in saturation between the reflective display and the transmissive display.

SUMMARY OF THE INVENTION

In order to solve the above problems, the inventor of the present invention found that brightness of the reflected light reflected by the reflective layer can be ensured by constituting the colored layer so as to overlap only a part of the reflective layer in a two-dimensional direction, and constituting the colored layer so as not to overlap other parts of the reflective layer.

In particular, in a case of the transflective display type electro-optical device, a reflective layer having an optical aperture is provided, a colored layer at least partly overlaps the optical aperture, and the colored layer overlaps only a part of the reflective layer, leading to improvement of saturation of the transmissive display while ensuring brightness of the reflective display.

More specifically, the color concentration of the colored layer is set to a predetermined value in advance so as to obtain an excellent transmissive display with the colored layer overlapping the optical aperture, and then, brightness of the reflective display can be ensured by adjusting the overlapping ratio of the colored layer on the reflective layer.

The electro-optical device of the present invention comprises an electro-optical substance layer disposed between a pair of substrates (for example, a liquid crystal layer), a colored layer disposed between one of the pair of substrates and the electro-optical, substance layer, and a reflective layer having a reflection part for reflecting the light passing through the electro-optical substance layer and the colored layer and an aperture, and the colored layer is disposed on the aperture, and disposed only on a part of the reflection part.

According to the present invention, the colored layer is disposed on the aperture, and disposed only on a part of the reflection part, and thus, the brightness of the reflected light can be adjusted according to the overlapping ratio of the colored layer on the reflective layer, and such adjustment is not related to the overlapping condition of the colored layer on the optical aperture, and the color of the transmitted light is prevented from being influenced. Thus, the influence of the colored layer on the reflected light and the influence of the colored layer on the transmitted light can be set independently from each other.

Here, the ratio of the area of the reflection part overlapping the colored layer to the area of the reflective layer (hereinafter, referred to as "reflection coloring ratio") is preferably smaller than the ratio of the area of the aperture overlapping the colored layer to the area of the aperture (hereinafter, referred to as "transmission coloring ratio"). Since the transmitted light passing through the optical aperture is transmitted through the colored layer only once while the reflected light is transmitted through the colored layer twice, the brightness of the reflected light is lower than that of the transmitted light in a normal condition, and the saturation of the transmitted light is lower than the saturation of the reflected light. By setting the reflection coloring ratio to be smaller than the transmission coloring ratio, the brightness of the reflected light can be increased, the saturation of the transmitted light can be relatively improved, and the difference in color between the reflected light and the transmitted light can be reduced.

In addition, the colored layer is preferably disposed so as to completely cover the aperture. By disposing the colored layer so as to completely cover the optical aperture, the saturation of the transmitted light can be further increased.

In some cases, the reflective layer and the colored layer are disposed on one of the pair of substrates, and in some cases, the reflective layer is disposed on one of the pair of substrates, and the colored layer is disposed on the other of the pair of substrates. In each case, optically similar effect can be obtained.

The colored layer is preferably disposed in an expanding manner over the reflection part around the aperture from the top of the aperture. Since the colored layer is disposed in an expanding manner from the aperture over the reflection part therearound, the colored layer can be integrally formed. Thus, the pattern of the colored layer need not be formed into very small pieces, and can be easily manufactured with high yield.

Another electro-optical device of the present invention comprises an electro-optical substance layer disposed on a plurality of pixels, a colored layer disposed on each pixel, and a reflective layer having a reflection part disposed on each pixel and reflecting the light passing through the electro-optical substance layer and the colored layer and an aperture, and is characterized in that the colored layer is disposed on the aperture, and disposed only on a part of the reflection part.

According to the present invention, the colored layer is disposed on the aperture in a plurality of pixels, and disposed only on a part of the reflection part, and the brightness of the reflected light can be adjusted for each pixel according to the overlapping ratio of the colored layer on the reflective layer. However, such adjustment is non-related to the overlapping condition of the colored layer on the optical aperture, and the color of the transmitted light can be prevented from being influenced. Thus, the influence of the colored layer on the reflected light and the influence of the colored layer on the transmitted light can be set independently from each other for each pixel.

Here, the ratio of the area of the reflection part overlapping the colored layer to the total area of the reflective layer is preferably smaller than the ratio of the area of the aperture overlapping the colored layer to the total area of the aperture. Since the transmitted light passing through the optical aperture is transmitted through the colored layer only once while the reflected light is transmitted through the colored layer twice, the brightness of the reflected light is lower than that of the transmitted light in a normal condition, and the saturation of the transmitted light is lower than the saturation of the reflected light. By setting the reflection coloring ratio to be smaller than the transmission coloring ratio, the brightness of the reflected light can be increased, the saturation of the transmitted light can be relatively improved, and the difference in color between the reflected light and the transmitted light can be reduced for each pixel.

In addition, the colored layer is preferably disposed so as to completely cover the aperture. Since the colored layer is disposed to completely cover the optical aperture, the saturation of the transmitted light can be further increased.

In addition, a pair of substrates holding the electro-optical substance layer are provided, and in some cases, the reflective layer and the colored layer are disposed on one of the pair of substrates, and in some cases, the reflective layer is disposed on one of the pair of substrates, and the colored layer is disposed on the other of the pair of substrates. In each case, optically similar effect can be obtained.

The colored layer is preferably disposed in an expanding manner over the reflection part around the aperture from the top of the aperture in each pixel. Since the colored layer can be disposed for each pixel so as to realize an integrated structure so that the colored layer is expanded over the reflective layer therearound from an area overlapping in the two-dimensional direction on the aperture, the pattern of the colored layer need not be formed into very small pieces, and can be easily manufactured with high yield.

Another electro-optical device of the present invention comprises a pair of display electrodes, an electro-optical substance layer disposed between the pair of display electrodes, a plurality of pixels disposed corresponding to an overlapping area in the two-dimensional direction of the pair of display electrodes, a colored layer disposed in each of the pixels, and a reflective layer disposed in each of the pixels, and having a reflection part for reflecting the light passing through the electro-optical substance layer and the colored layer and an aperture, and is characterized in that the colored layer is disposed on the aperture, and disposed on a part of the reflection part.

In this case, the area of the aperture corresponding to each of the plurality of pixels is substantially identical to each other, and the area of the colored layer corresponding to at least one of the plurality of pixels is preferably different from the area of the colored layer corresponding to the rest of the plurality of pixels.

Still another electro-optical device of the present invention comprises an electro-optical substance layer disposed on a plurality of pixels, a plurality of kinds of colored layers disposed on the pixels and having colors different from each other, and a reflective layer disposed on each of the pixels and having a reflection part for reflecting the light passing through the electro-optical substance layer and the colored layer and an aperture, and is characterized in that the colored layer is disposed on the aperture and the reflection part, and at least one kind of the colored layers out of the plurality of kinds of colored layers is disposed only on a part of the reflection part.

In the present invention, the area of the aperture of the reflective layer is preferably set to be identical between the pixels having the colored layer of different colors. Since the area of the aperture of the reflective layer is set to be identical between the pixels having the colored layer of different colors, the incident light quantity in the pixel of each color can be equal to each other, the color of the transmissive display can be adjusted in a relatively easy manner. In addition, the area of the reflection part is set to be identical between the pixels having the colored layer of different colors, and when adjusting the color of the reflective display, the area on the reflection part of the colored layer for each color can be easily adjusted.

In the present invention, the coverage area ratio (equivalent to the above reflection coloring ratio) is preferably different from each other between the pixels having the colored layer of at least two different colors. Thus, the color of the reflective display can be optimized by adjusting the optical characteristic of the colored layer of each color so as to optimize the color of the transmissive display realized by the transmitted light passing through the aperture, and adjusting the coverage area ratio of the colored layer of each color overlapping the reflection part. Thus, the color of the transmissive display and the color of the reflective display can be adjusted independently from each other for each color.

In the present invention, the colored layers of red, green and blue colors are provided, and the coverage area ratio of the colored layer of green color is preferably smaller than the coverage area ratio of the colored layers of red and blue colors. The transmissive display is constituted by the light transmitted through the colored layer only once in the area overlapping the aperture while the reflective display is mainly constituted by the light transmitted through the colored layer twice in the area overlapping the reflection part, and also influenced by the reflected light by the colored layer in the area partially overlapping the aperture. Thus, generally, the saturation of the reflective display is higher than that of the transmissive display while the reflective display is easily darkened. Since the specific luminous efficacy has a peak at the wavelength range of yellowish green, the reflective display is darkened if the saturation of red and blue light is higher while the reflective display is less easily darkened even when the saturation of green light is higher. Thus, if the brightness is increased in the reflective display, the saturation of red and blue colors is easily degraded in particular. Thus, in the red and blue pixels, the saturation is ensured by increasing the coverage area ratio (that means, by eliminating or reducing the area of the reflection part not overlapping the colored layer). In the green pixel, the quantity of the reflected light is ensured by degrading the coverage area ratio (that is, by increasing the area of the reflection part not overlapping the colored layer), and then, the brightness can be increased considerably while ensuring the color reproducibility of the reflective display.

In the present invention, the coverage area ratio of the colored layer of green color is preferably 30-50%, and the coverage area ratio of the colored layers of red and blue colors is preferably 60-100%. The color reproducibility and the brightness of the reflective display can be improved while ensuring the color reproducibility of the transmissive display by setting the coverage area ratio of green color and the coverage area ratio of red and blue colors in the above ranges. In particular, the coverage area ratio of the colored layer of green color is most preferably 35-45%, and the coverage area ratio of the colored layers of red and blue colors is most preferably 85-100%.

In the present invention, the reflection part is preferably disposed on the entire periphery of the aperture. Since the aperture is surrounded by the reflection part in the reflective layer, any area not covered by the colored layer is prevented from being generated in the aperture even when a slight positional deviation is generated between the colored layer and the reflective layer. In particular, the aperture is preferably formed substantially in the center of the reflective layer.

In the present invention, the aperture ratio by the aperture with respect to the reflective layer is preferably 30-70%. Generally, if the aperture ratio of the reflective layer is increased, the transmissive display is brightened while the reflective display is darkened, and it is necessary to set the aperture ratio of the reflective layer so as to take balance between the transmissive display and the reflective display. More specifically, if the aperture ratio is too small, the illuminance of the backlight must be higher, and the power consumption of the backlight is increased. On the other hand, if the aperture ratio is too large, the reflective display is darkened, and less easily recognized visually. In the present embodiment, the brightness of the reflective display can be realized by providing an area not overlapping the colored layer on a part of the reflection part, and the transmissive display and the reflective display can be balanced in the range of the large aperture ratio compared with the case of employing a structure with the colored layer overlapping the entire reflective layer, and excellent color quality can be realized in both the transmissive display and the reflective display. When the aperture ratio is below the above range, the power consumption is increased so as to ensure the brightness of the transmissive display, the present embodiment is less easily employed in a portable electronic apparatus such as a cellular phone. If the aperture ratio is above the range, the brightness and the saturation in the reflective display are less easily consistent, and the color quality in the reflective display is less easily ensured.

The electronic apparatus of the present invention comprises any one of the above electro-optical device and a control means for controlling the electro-optical device. In particular, the electronic apparatus of the present invention include one having a liquid crystal display device capable of color display for the electro-optical device, for example, a cellular phone, a portable information terminal, and an image pick-up apparatus having the liquid crystal display function. If the electro-optical device is used for a display unit of the electronic apparatus, difference in color between the reflective display and the transmissive display can be reduced, and high display quality can be realized thereby.

The reflective display and the transmissive display have each coloring mode suitable therefor. There are no problems if separate color filters can be provided. However, in reality, both displays must be realized by a common color filter. In the present invention, the coloring mode of the reflective display and the coloring mode of the transmissive display can be set separately even when the colored layer is common by changing the reflection coloring ratio and the transmission coloring ratio to each other as described above.

Next, the color filter substrate of the present invention comprises a substrate, a reflective layer disposed on the substrate and having a reflection part for reflecting the light and an aperture, and a colored layer disposed on the substrate, and is characterized in that the colored layer is disposed on the aperture, and disposed only on a part of the reflection part.

According to the present invention, the colored layer is disposed on the aperture, and disposed only on a part of the reflection part, and thus, the brightness of the reflected light can be adjusted according to the overlapping ratio of the colored layer on the reflective layer. Such adjustment is non-related to the overlapping condition between the colored layer and the optical aperture, and any influence on the color of the transmitted light can be prevented. Thus, the influence of the colored layer on the reflected light and the influence of the colored layer on the transmitted light can be set independently from each other.

Here, the ratio of the area of the reflection part with the colored layer disposed thereon to the total area of the reflection part is preferably smaller than the ratio of the area of the aperture with the colored layer disposed thereon to the total area of the aperture. Since the transmitted light passing through the optical aperture is transmitted through the colored layer only once while the reflected light is transmitted through the colored layer twice, the brightness of the reflected light is lower than that of the transmitted light in a normal condition, and the saturation of the transmitted light is lower than the saturation of the reflected light. By setting the reflection coloring ratio to be smaller than the transmission coloring ratio, the brightness of the reflected light can be increased, the saturation of the transmitted light can be relatively improved, and the difference in color between the reflected light and the transmitted light can be reduced for each pixel.

The colored layer is preferably disposed so as to completely cover the optical aperture. Since the colored layer is disposed so as to completely cover the optical aperture, the saturation of the transmitted light can be further improved.

The colored layer is preferably disposed in an expanding manner over the reflection part around the aperture from the top of the aperture. Since the colored layer is disposed in an expanding manner from the aperture over the reflection part therearound, the colored layer can be integrally formed. Thus, the pattern of the colored layer need not be formed into very small pieces, and can be easily manufactured with high yield.

Another color filter substrate of the present invention comprises a substrate with pixels set thereto, a colored layer disposed on the substrate according to the pixels, a reflective layer disposed on the substrate according to the pixels and having a reflection part for reflecting the light and an aperture, and is characterized in that the colored layer is disposed on the aperture, and disposed only on a part of the reflection part.

According to the present invention, the colored layer is disposed on the aperture, and disposed only on a part of the reflection part, and thus, the brightness of the reflected light can be adjusted for each pixel according to the overlapping ratio of the colored layer on the reflective layer. Such adjustment is non-related to the overlapping condition between the colored layer and the optical aperture, and any influence on the color of the transmitted light can be prevented. Thus, the influence of the colored layer on the reflected light and the influence of the colored layer on the transmitted light can be set independently from each other.

Here, the ratio of the area of the reflection part with the colored layer disposed thereon to the total area of the reflection part is preferably smaller than the ratio of the area of the aperture with the colored layer disposed thereon to the total area of the aperture. Since the transmitted light passing through the optical aperture is transmitted through the colored layer only once while the reflected light is transmitted through the colored layer twice, the brightness of the reflected light is lower than that of the transmitted light in a normal condition, and the saturation of the transmitted light is lower than the saturation of the reflected light. By setting the reflection coloring ratio to be smaller than the transmission coloring ratio, the brightness of the reflected light can be increased, the saturation of the transmitted light can be relatively improved, and the difference in color between the reflected light and the transmitted light can be reduced for each pixel.

The colored layer is preferably disposed so as to completely cover the optical aperture. Since the colored layer is disposed so as to completely cover the optical aperture, the saturation of the transmitted light can be further improved.

The colored layer is preferably disposed in an expanding manner over the reflection part around the aperture from the top of the aperture. Since the colored layer is disposed in an expanding manner from the aperture over the reflection part therearound, the colored layer can be integrally formed. Thus, the pattern of the colored layer need not be formed into very small pieces, and can be easily manufactured with high yield.

Another color filter substrate of the present invention comprises a substrate with pixels set thereto, a plurality of kinds of colored layers disposed on the substrate according to the pixels and having colors different from each other, a reflective layer disposed on the substrate according to the pixels and having a reflection part for reflecting the light and an aperture, and is characterized in that the colored layer is disposed on the aperture and the reflection part, and at least one kind of the plurality of kinds of colored layers is disposed only on a part of the reflection part.

In the present invention, the area of the aperture of the reflective layer is preferably set to be identical between the pixels having the colored layer of different colors. Since the area of the aperture of the reflective layer is set to be identical between the pixels having the colored layer of different colors, the incident light quantity in the pixel of each color can be equal to each other, the color of the transmissive display can be adjusted in a relatively easy manner. In addition, the area of the reflection part is set to be identical between the pixels having the colored layers of different colors, and when adjusting the color of the reflective display, the area on the reflection part of the colored layer for each color can be easily adjusted.

The coverage area ratio on the reflection part of the colored layer is preferably different from each other between the pixels having the colored layer of at least two different colors. Thus, the color of the reflective display can be optimized by adjusting the optical characteristic of the colored layer of each color so as to optimize the color of the transmissive display realized by the transmitted light passing through the aperture, and adjusting the coverage area ratio of the colored layer of each color overlapping the reflection part. Thus, the color of the transmissive display and the color of the reflective display can be adjusted independently from each other for each color.

In the present invention, the colored layers of red, green and blue colors are provided, and the coverage area ratio of the colored layer of green color is preferably smaller than the coverage area ratio of the colored layers of red and blue colors. The transmissive display is constituted by the light transmitted through the colored layer only once in the area overlapping the aperture while the reflective display is mainly constituted by the light transmitted through the colored layer twice in the area overlapping the reflection part, and also influenced by the reflected light by the colored layer in the area partially overlapping the aperture. Thus, generally, the saturation of the reflective display is higher than that of the transmissive display while the reflective display is easily darkened. Since the specific luminous efficacy has a peak at the wavelength range of yellowish green, the reflective display is darkened if the saturation of red and blue light is higher while the reflective display is less easily darkened even when the saturation of green light is higher. Thus, if the brightness is increased in the reflective display, the saturation of red and blue colors is easily degraded in particular. Thus, in the red and blue pixels, the saturation is ensured by increasing the coverage area ratio (that means, by eliminating or reducing the area of the reflection part not overlapping the colored layer). In the green pixel, the quantity of the reflected light is ensured by degrading the coverage area ratio (that is, by increasing the area of the reflection part not overlapping the colored layer), and then, the brightness can be increased considerably while ensuring the color reproducibility of the reflective display.

In addition, the coverage area ratio of the colored layer of green color is preferably 30-50%, and the coverage area ratio of the colored layers of red and blue colors is preferably 60-100%. The color reproducibility and the brightness of the reflective display can be improved while ensuring the color reproducibility of the transmissive display by setting the coverage area ratio of green color and the coverage area ratio of red and blue colors in the above ranges. In particular, the coverage area ratio of the colored layer of green color is most preferably 35-45%, and the coverage area ratio of the colored layers of red and blue colors is most preferably 85-100%.

In addition, the reflection part is preferably disposed on the entire periphery of the aperture. Since the aperture is surrounded by the reflection part in the reflective layer, any area not covered by the colored layer is prevented from being generated in the aperture even when a slight positional deviation is generated between the colored layer and the reflective layer. In particular, the aperture is preferably formed substantially in the center of the reflective layer.

In addition, the aperture ratio by the aperture with respect to the reflective layer is preferably 30-70%. Generally, if the aperture ratio of the reflective layer is increased, the transmissive display is brightened while the reflective display is darkened, and it is necessary to set the aperture ratio of the reflective layer so that the transmissive display and the reflective display are balanced. More specifically, if the aperture ratio is too small, the illuminance of the backlight must be higher, and the power consumption of the backlight is increased. On the other hand, if the aperture ratio is too large, the reflective display is darkened, and less easily recognized visually. In the present embodiment, the brightness of the reflective display can be ensured by providing an area not overlapping the colored layer on a part of the reflection part, and the transmissive display and the reflective display can be balanced in the range of the large aperture ratio compared with the case of employing a structure with the colored layer overlapping the entire reflective layer, and excellent color quality can be realized in both the transmissive display and the reflective display. When the aperture ratio is below the above range, the power consumption is increased so as to ensure the brightness of the transmissive display, the present embodiment is less easily employed in a portable electronic apparatus such as a cellular phone. If the aperture ratio is above the range, the brightness and the saturation in the reflective display are less easily consistent, and the color quality in the reflective display is less easily ensured.

BRIEF DESCRIPTION OF THE DRAWINGS

FIG. 4(a) is a schematic sectional view schematically showing a sectional structure of a liquid crystal display panel 400 of a third embodiment of an electro-optical device according to the present invention, and FIG. 4(b) is a schematic expanded plan view of a color filter substrate.

FIG. 7(d) is a schematic sectional view of Configuration 7.

FIG. 17 is a graph (a) and a graph (b) indicating spectral transmittance of a colored layer.

DETAILED DESCRIPTION OF THE PREFERRED EMBODIMENTS

Next, description will be given below in detail on the embodiments of an electro-optical device, a color filter substrate and an electronic apparatus in accordance with the present invention with reference to the attached drawings.

[First Embodiment]

Figure 1:
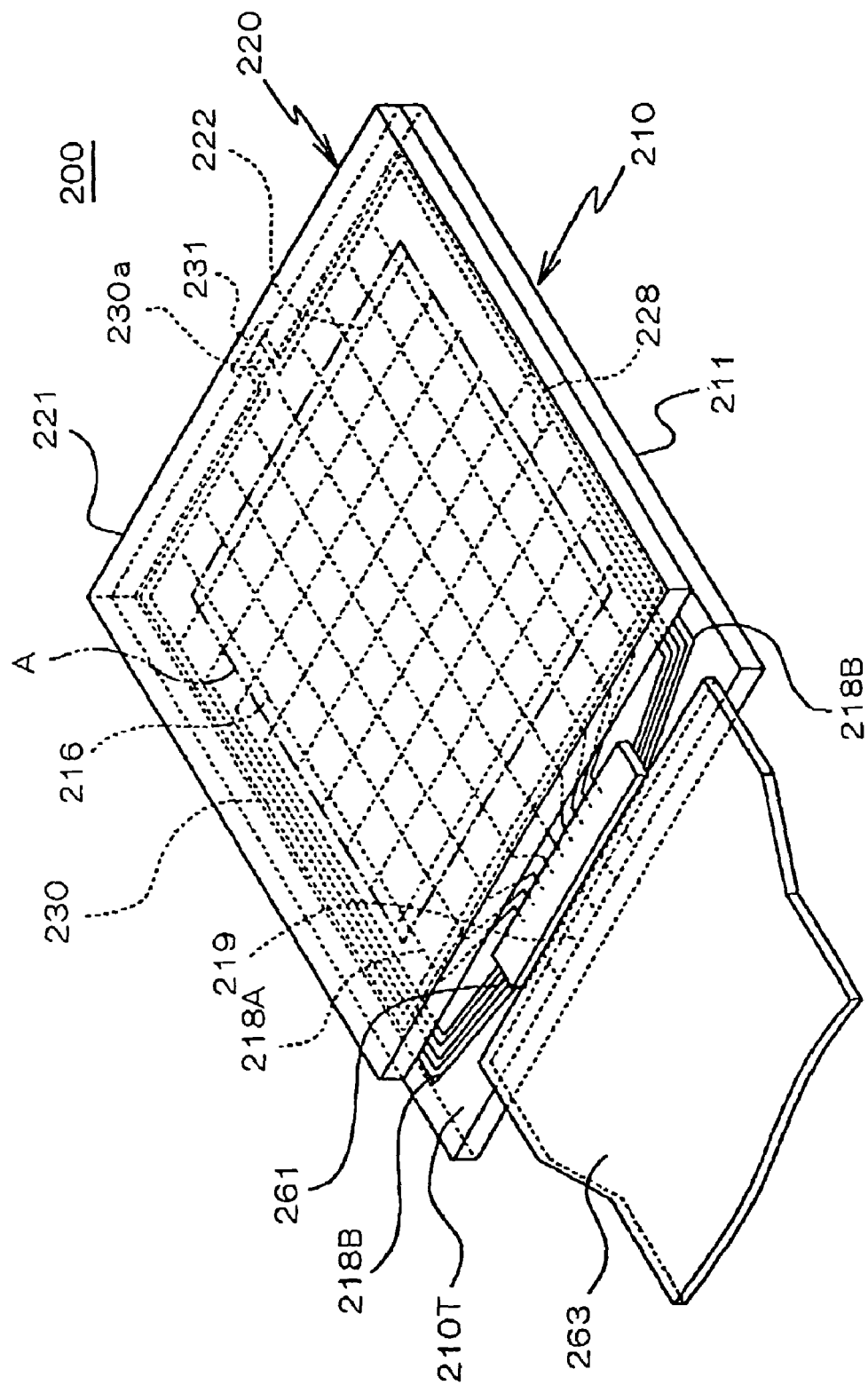
FIG. 1 is a schematic perspective view of a liquid crystal display panel showing appearance of an liquid crystal display panel 200 in a first embodiment of an electro-optical device according to the present invention.

FIG. 1 is a schematic perspective view showing the appearance of a liquid crystal display panel 200 constituting an electro-optical device according to a first embodiment of the present invention, FIG. 2(a) is a schematic sectional view of the liquid crystal display panel 200, and FIG. 2(b) is a partially enlarged plan view of a color filter 210 constituting the liquid crystal display panel 200.

This electro-optical device has an illumination device such as a backlight and a front light (not shown), a casing, etc. as necessary on the liquid crystal display panel 200 having a so-called transflective passive matrix structure.

As shown in FIG. 1, the liquid crystal display panel 200 has a cell structure in which a color filter substrate 210 basically consisting of a transparent first substrate 211 formed of a glass plate or a synthetic resin plate, and a facing substrate 220 basically comprising a similar second substrate 221 facing thereto are affixed to each other via sealing members 230, and sealed with sealant 231 after liquid crystal 232 is poured from an inlet 230a inside the sealing members 230.

A plurality of parallel striped transparent electrodes 216 are formed on an inner surface of the first substrate 211 (a surface facing the second substrate 221), and a plurality of parallel striped transparent electrodes 222 are formed on an inner surface of the second substrate 221. The transparent electrode 216 is electrically connected to a wire 218A, and the transparent electrode 222 is electrically connected to a wire 228. The transparent electrode 216 and the transparent electrode 222 are orthogonal to each other, and an intersected area thereby constitute a large number of pixels arrayed in a matrix, and these pixel arrays constitute a liquid crystal display area A.

The first substrate 211 has a substrate expansion part 210T which is expanded outward of the contour of the second substrate 221, and the wire 218A, a wire 218B electrically connected to the wire 228 via upper and lower conductive parts constituted by a part of the sealing members 230, and an input terminal unit 219 comprising a plurality of independent wiring patterns are formed on this substrate expansion part 210T. A semiconductor IC 261 with a liquid crystal drive circuit, etc. built therein is mounted on the substrate expansion part 210T so as to be electrically connected to the wires 218A and 218B, and the input terminal unit 219. A flexible circuit board 263 is mounted on an end of the substrate expansion part 210T so as to be electrically connected to the input terminal unit 219.

Figure 2:
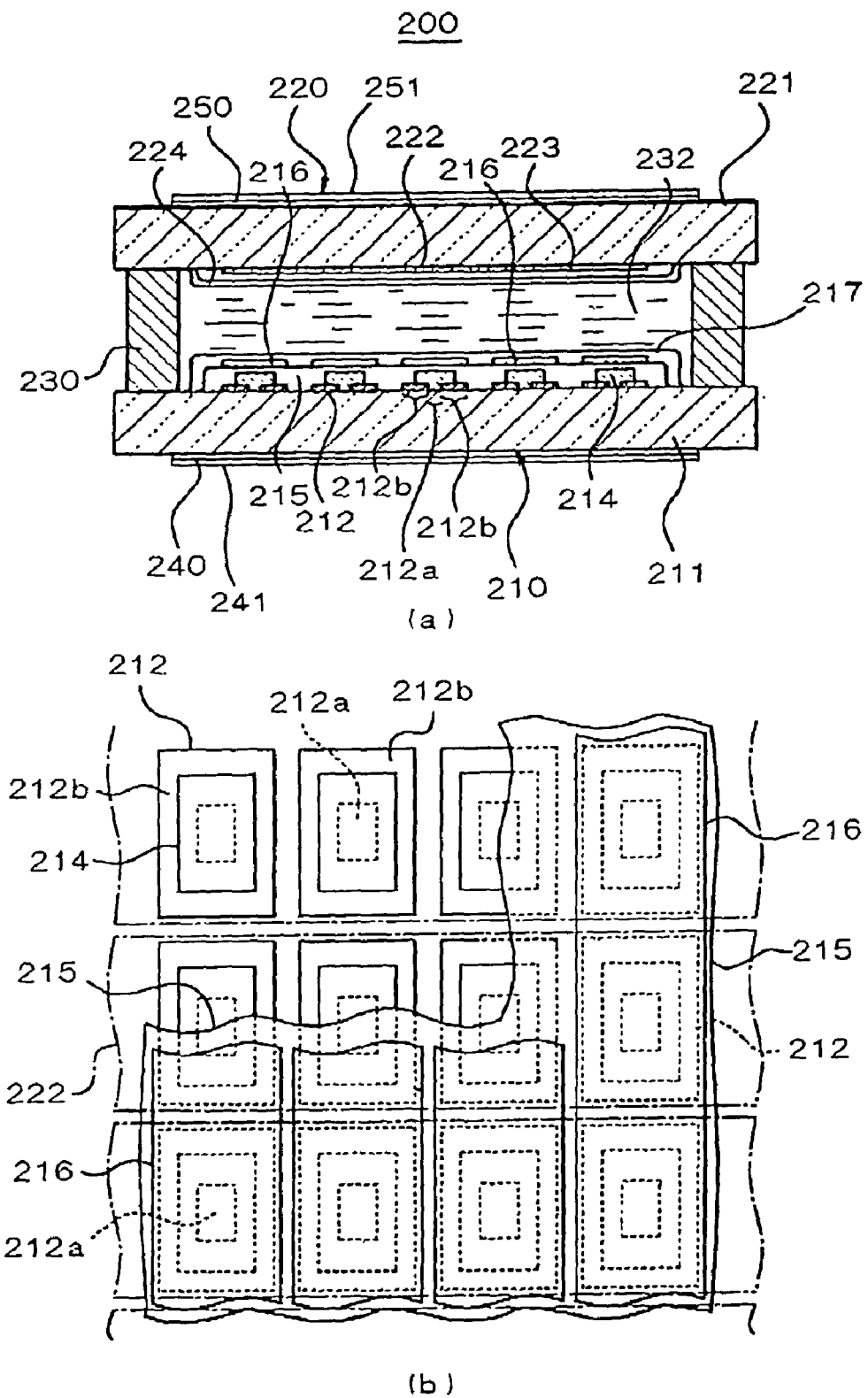
FIG. 2(a) is a schematic sectional view schematically showing a sectional structure of a first embodiment.
FIG. 2(b) is a schematic expanded plan view of a color filter substrate.

In this liquid crystal display panel 200, a retardation film (a quarter wavelength plate) 240 and a polarizer 241 are disposed on an outer surface of the first substrate 211 as shown in FIG. 2, and a retardation film (a quarter wavelength plate) 250 and a polarizer 251 are disposed on an outer surface of the second substrate 221.

Next, description will be made on the structure of the color filter substrate 210 with reference to FIGS. 2(a) and 2(b). A reflective layer 212 is formed on the surface of the first substrate 211, and an aperture 212a is formed for each pixel. A part other than the aperture 212a forms a reflection part 212b for substantially reflecting the light. In the present embodiment, the reflective layer 212 having the aperture 212a and the reflection part 212b is formed in each pixel. Alternatively, the reflective layer 212 is formed over the entire liquid crystal display area A, and only the aperture 212a may be formed in each pixel.

A colored layer 214 is formed on the reflective layer 212, and covered by a surface protection layer (an overcoat layer) 215 formed of transparent resin, etc. A color filter comprises this colored layer 214 and the surface protection layer 215.

Generally, the colored layer 214 presents a predetermined color by diffusing coloring agents such as pigment and dye in transparent resin. One example of the tone of the colored layer includes combination of three colors of R (Red), G (Green) and B (Blue) for a filter of primary color system, but not limited thereto, and the tone of colored layer can be formed by a filter of complementary color system, and other various tones. Usually, a colored layer having a predetermined color pattern is formed by applying a coloring resist consisting of a photosensitive resin containing a coloring agent such as pigment and dye to a substrate surface, and removing unnecessary portions by a photolithography method. The above steps are repeated if a colored layer of a plurality of tones is formed.

A stripe array is employed in an example shown in FIG. 2(b) for an array pattern of the colored layer, and in addition to this stripe array, various kinds of pattern shapes such as a delta array, and a diagonal mosaic array can be employed. In addition, a shielding film (a black matrix or a black mask) for shielding the light from an area between pixels can be formed for a part of the colored layer around each colored layer of RGB described above.

A transparent electrode 216 consisting of a transparent conductor such as ITO (Indium Tin Oxide) is formed on a surface protection layer 215. The transparent electrode 216 is formed in a stripe extending in the vertical direction in FIG. 2(b), and a plurality of transparent electrodes 216 are arrayed parallel to each other in a stripe. An alignment layer 217 consisting of polyimide resin, etc. is formed on the transparent electrode 216.

In the present embodiment, as shown in FIG. 2(b), the colored layers 214 constituting the color filter overlap in a two-dimensional direction so as to completely cover the aperture 212a in the reflective layer 212 in each pixel, and are integrally formed so as to be expanded over the reflection part 212b around the aperture 212a from an overlapping area on the aperture 212a in a two-dimensional direction toward the periphery thereof.

The colored layer 214 is not formed entirely over each pixel, but formed so as to overlap a part of the reflective layer 212. This means that the reflective layer 212 includes an area overlapping the colored layer 214 in a two-dimensional direction (an inner peripheral area facing the aperture 212a in the figure) and an area not overlapping the colored layer 214 (an outer peripheral area in the figure).

On the other hand, in the above liquid crystal display panel 200, a facing substrate 220 facing the color filter substrate 210 formed by successively laminating a transparent electrode 222 similar to that described above, a hard protective film 223 formed of SiO$_2$ and TiO$_2$, and the alignment layer 224 similar to that described above on the second substrate 221 formed of glass, etc.

In the present embodiment described above, a part of the external light incident on the reflection part 212b from the facing substrate 220 side is transmitted through the colored layer 214, and reflected by the reflection part 212b, and a part thereof is not transmitted through the colored layer 214 but reflected by the reflection part 212b, and again, transmitted through the facing substrate 220 and emitted therefrom. The external light transmitted through the colored layer 214 is transmitted through the colored layer 214 two times while the external light not transmitted through the colored layer 214 is emitted therefrom without being transmitted through the colored layer 214. Thus, the brightness of the reflective display can be improved in comparison with the brightness when the colored layer 214 entirely covers the reflective layer 212 in the pixel.

On the other hand, the colored layer 214 entirely covers the aperture 212a of the reflective layer 212, and if a backlight, etc. is disposed on a back side thereof, for example, color filter substrate 210, and the back side thereof is irradiated with the illumination light, a part of the illumination light is transmitted through the aperture 212a and the colored layer 214, and transmitted through the liquid crystal 232 and the facing substrate 220, and emitted therefrom. Thus, the transmitted light is transmitted through the colored layer 214 only once, and the transmissive display type color according to the color concentration of the colored layer 214 (the degree of deviation of the spectral distribution of the visible light area through which the light is transmitted) can be obtained. The saturation of the reflected light is degraded because the reflected light component not transmitted through the colored layer is included as described above, and the transmissive display type saturation is relatively increased.

In the present embodiment, the color, in particular, brightness of the reflective display can be ensured by forming the optical characteristic of the colored layer 214 so as to be ready for the transmissive display, and adjusting the reflection area of the reflection part 212b overlapping the colored layer 214 in a two-dimensional direction. Therefore, the transmissive display type saturation can be increased while ensuring the brightness of the reflective display. In addition, difference in color (in particular, saturation and brightness) between the reflective display and the transmissive display can be reduced.

The above effect is particularly suitable when the colored layer is formed in a substantially uniform color concentration on the whole (for example, in a case in which the concentration of the coloring agent such as pigment and dye is substantially uniform) and the colored layer is formed in a substantially uniform thickness on the whole similar to the regular manufacturing step of the colored layer. In this case, the optical characteristic of the area overlapping the aperture 212a in the colored layer 214 in a two-dimensional direction is substantially agreed with that f the area overlapping the reflection part 212b in the colored layer 214 in a two-dimensional direction, and large difference in saturation and brightness is generated between the color of the reflective display and the color of the transmissive display, resulting in the considerable effect of the present invention.

The reflective display and the transmissive display have the coloring mode of the respectively suitable color, and a separate color filter may be disposed respectively. However, in an actual manufacture, a common color filter capable of realizing both displays is preferable. In the present embodiment, by changing the reflection coloring ratio and the transmission coloring ratio from each other as described above, the coloring mode of the reflective display and the coloring mode of the transmissive display can be set separately even if the colored layer is common.

[Second Embodiment]

Figure 3:
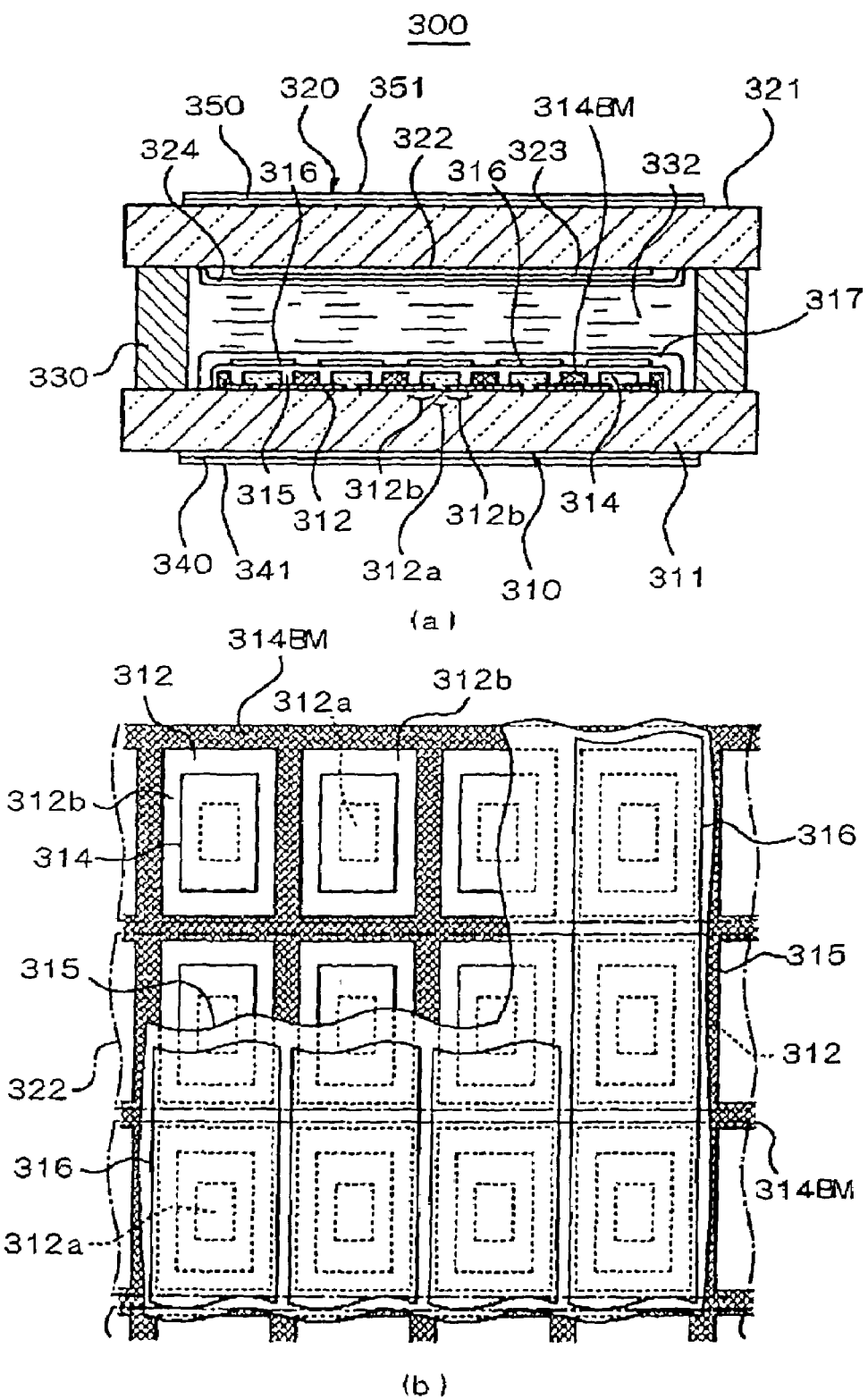
FIG. 3(a) is a schematic sectional view schematically showing a sectional structure of a liquid crystal display panel 300 of a second embodiment of an electro-optical device according to the present invention.
FIG. 3(b) is a schematic expanded plan view of a color filter substrate.

Next, description will be made on a second embodiment of the present invention with reference to FIGS. 3(a) and 3(b). The liquid crystal display panel 300 of the present embodiment comprises a first substrate 311, a second substrate 321, a colored layer 314, a surface protection layer 315, a transparent electrode 316, an alignment layer 317, a transparent electrode 322, a hard protection film 323, an alignment layer 324, a sealing member 330, a liquid crystal 332, retardation films 340 and 350, and polarizers 341 and 351 similarly to the first embodiment described above, and description of these components is omitted.

In the liquid crystal display panel 300 of the present embodiment, the reflective layer 312 is integrally formed in a substantially overall manner in the liquid crystal display area, and an aperture 312 is disposed for each pixel. A part other than the aperture 312a out of the reflective layer 312 forms a reflection part 312b for substantially reflecting the light. A black shielding film 314BM consisting of black resin, etc. is formed in an area between pixels. The black resin includes transparent resin with coloring agent such as black pigment and dye diffused therein, or transparent resin with coloring agent of three colors of R (Red), G (Green) and B (Blue) mixed with each other and diffused in the transparent resin.

In the present embodiment, the reflective layer 312 is integrally formed over a plurality of pixels. However, the reflective layer may be formed for each pixel as described in the first embodiment, and the black shielding film may be formed between the reflective layers.

[Third Embodiment]

Next, description will be made on a third embodiment in accordance with the present invention with reference to FIGS. 4(a) and 4(b). A liquid crystal display panel 400 of the present embodiment comprises a first substrate 411, a second substrate 421, a reflective layer 412 having an aperture 412a and a reflection part 412b, a transparent electrode 416, an alignment layer 417, a transparent electrode 422, an alignment layer 423, sealing members 430, a liquid crystal 432, retardation films 440 and 450, and polarizer 441 and 451, and the description on these components will be omitted.

In the present embodiment, as shown in FIG. 4(a), a color filter is formed not on a first substrate 421 with a reflective layer 412 formed thereon, but on a second substrate 421. More specifically, a color filter 424 is formed on the second substrate 421 for each pixel, and a black shielding film 424BM similar to that in the second embodiment is formed in the area between pixels. A transparent surface protection layer 425 is formed on the colored layer 424 and the black shielding film 424BM.

A transparent electrode 422 is formed on the surface protection layer 425, and the alignment layer 423 is formed on the transparent electrode 422.

As shown in FIG. 4(b), the colored layer 424 (shown by a one-dot line in the figure) of the color filter substrate 420 overlaps the aperture 412a of the reflective layer 412 in a two-dimensional direction with respect to the reflection substrate 410 with the reflective layer 412 formed thereon so as to completely cover the aperture 412a. The colored layer 424 integrally formed so as to be expanded to an area overlapping the reflection part 412b of the reflective layer 412 from an area overlapping the aperture 412a in a two-dimensional direction. This means that the reflective layer 412 has an area overlapping the colored layer 424 in a two-dimensional direction (an inner peripheral area in the figure), and an area not overlapping the colored layer 424 in a two-dimensional direction (an outer peripheral area in the figure).

As shown in the present embodiment, even when the reflective layer 412 and the colored layer 424 are formed on different substrates, similar operational effect to that of the first embodiment and the second embodiment can be achieved if the reflective layer 412 overlaps the colored layer 424 in a two-dimensional direction as described above.

[Other Configurations]

Next, description will be made on other configurations applicable of each embodiment described above with reference to FIGS. 5(a) to 5(d) and FIGS. 6(a) to 6(d). In each configuration described below, only the two-dimensional positional relationship between the reflective layer and the colored layer is shown and described.

(Configuration 1)

Figure 5:
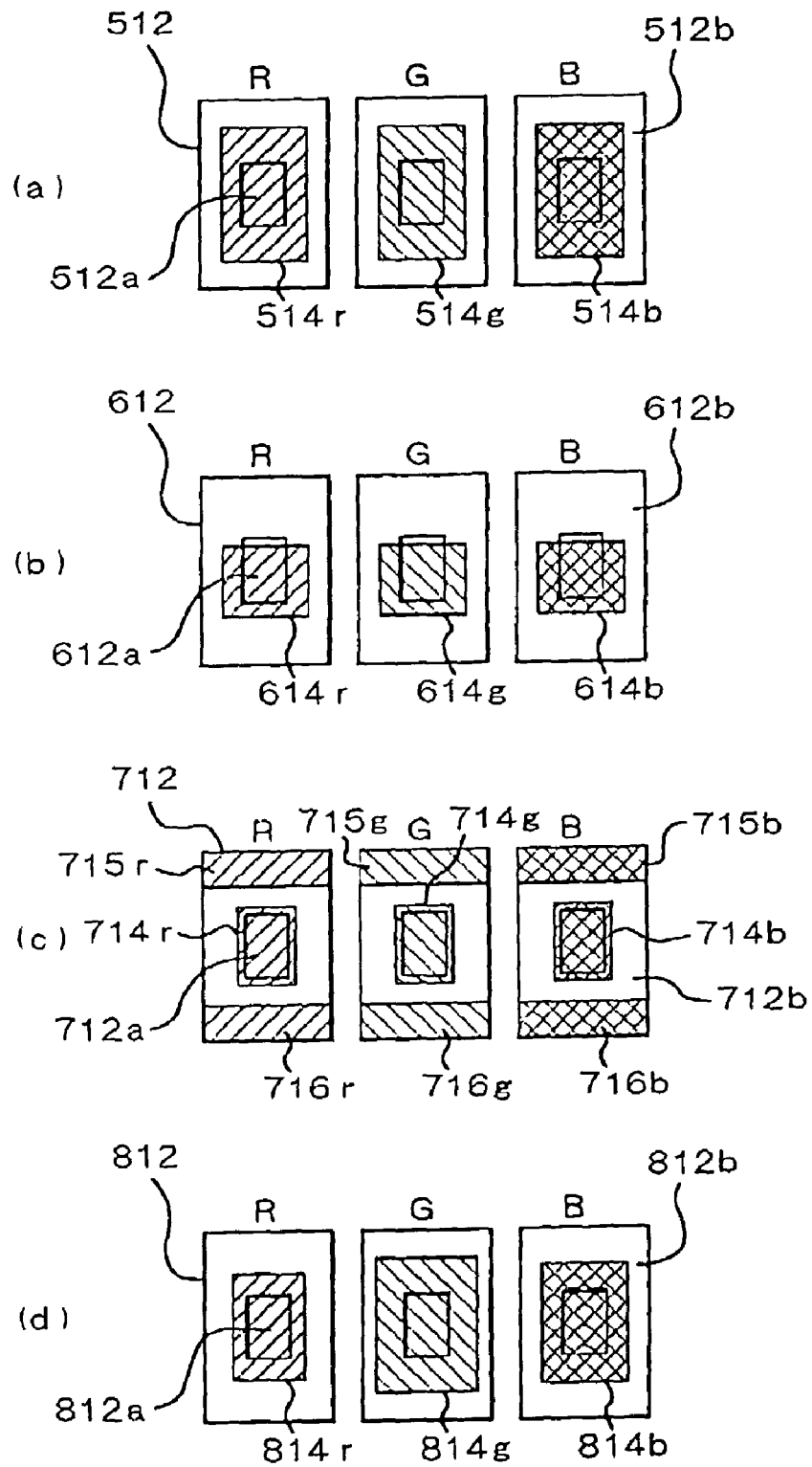
FIGS. 5(a) to 5(d) are diagrammatic illustration schematically showing an overlapping condition of a reflective layer and a colored layer according to other Configurations 1 to 4.

In Configuration 1 shown in FIG. 5(a), a colored layer 514r presenting the hue of R (Red), a colored layer 514g presenting the hue of G (Green), and a colored layer 514b presenting the hue of B (Blue) are formed on a reflective layer 512 having an aperture 512a are formed in an overlapping manner in the two-dimensional direction in each pixel. In this Configuration, the colored layers 514r, 514g and 514b in each pixel completely covers the aperture 512a similar to each embodiment described above, and integrally formed in an expanding manner from an area overlapping the aperture 512a in a two-dimensional direction to an area overlapping a peripheral reflective surface in a two-dimensional direction.

(Configuration 2)

In Configuration 2 shown in FIG. 5(b), a colored layer 614r presenting the hue of R (Red), a colored layer 614g presenting the hue of G (Green), and a colored layer 614b presenting the hue of B (Blue) are formed on a reflective layer 612 having an aperture 612a are formed in an overlapping manner in the two-dimensional direction in each pixel. In this Configuration, the colored layers 614r, 614g. and 614b do not completely cover the aperture 612a, and there exists an area which does not overlap the colored layer in a two-dimensional direction in a part of the aperture 612a.

In this Configuration 2, in order to reduce difference in color between the reflective display and the transmissive display, the reflection coloring ratio (the area ratio of an area overlapping the colored layer in a two-dimensional direction to the total reflection area of the reflective layer 612) is set to be smaller than the transmission coloring ratio (the area ratio of an area overlapping the colored layer in a two-dimensional direction to the total area of the aperture 612a). As a result, the brightness of the reflective display is improved, and the saturation of the transmissive display is relatively increased.

(Configuration 3)

In Configuration 3 shown in FIG. 5(c), a plurality of colored layers 714r, 715r and 716r presenting the hue of R (Red), a plurality of colored layers 714g, 715g and 716g presenting the hue of G (Green), and a plurality of colored layers 714b, 715b and 716b presenting the hue of B (Blue) are formed on a reflective layer 712 having an aperture 712a in an overlapping manner in the two-dimensional direction in each pixel.

In this Configuration, the colored layers 714r, 714g and 714b overlap the aperture 712a in the two-dimensional direction, and the colored layers 715r, 715g, 715b, 716r, 716g and 716b overlap only the reflection surface of the reflective layer 712 in the two-dimensional direction. A plurality of colored layers may thus be constituted in an overlapping manner in the two-dimensional direction in each pixel.

(Configuration 4)

In Configuration 4 shown in FIG. 5(d), a colored layer 814r presenting the hue of R (Red), a colored layer 814g presenting the hue of G (Green), and a colored layer 814b presenting the hue of B (Blue) are formed on a reflective layer 812 having an aperture 812a are formed in an overlapping manner in the two-dimensional direction. In this Configuration, the colored layers 814r, 814g and 814b are constituted so as to have an area different from each other, and as a result, the reflection coloring ratio (the area ratio of an area overlapping the colored layer in a two-dimensional direction to the total reflection area in each pixel) is different from each other according to the hue R (Red), G (Green) and B (Blue) of the colored layer. More generally, the ratio of the above reflection coloring ratio to the transmission coloring ratio (the area ratio of an area of the aperture overlapping the colored layer in a two-dimensional direction to the total area of the aperture in each pixel) is different for each color.

According to Configuration 4, not only the color of the reflective display and the transmissive display can be set separately as described in the above embodiments and Configurations, but also appropriate color can be obtained according to the material of the colored layer of each color by setting the above reflection coloring ratio (or the ratio of the reflection coloring ratio to the transmission coloring ratio) separately by the color.

(Configuration 5)

Figure 6:
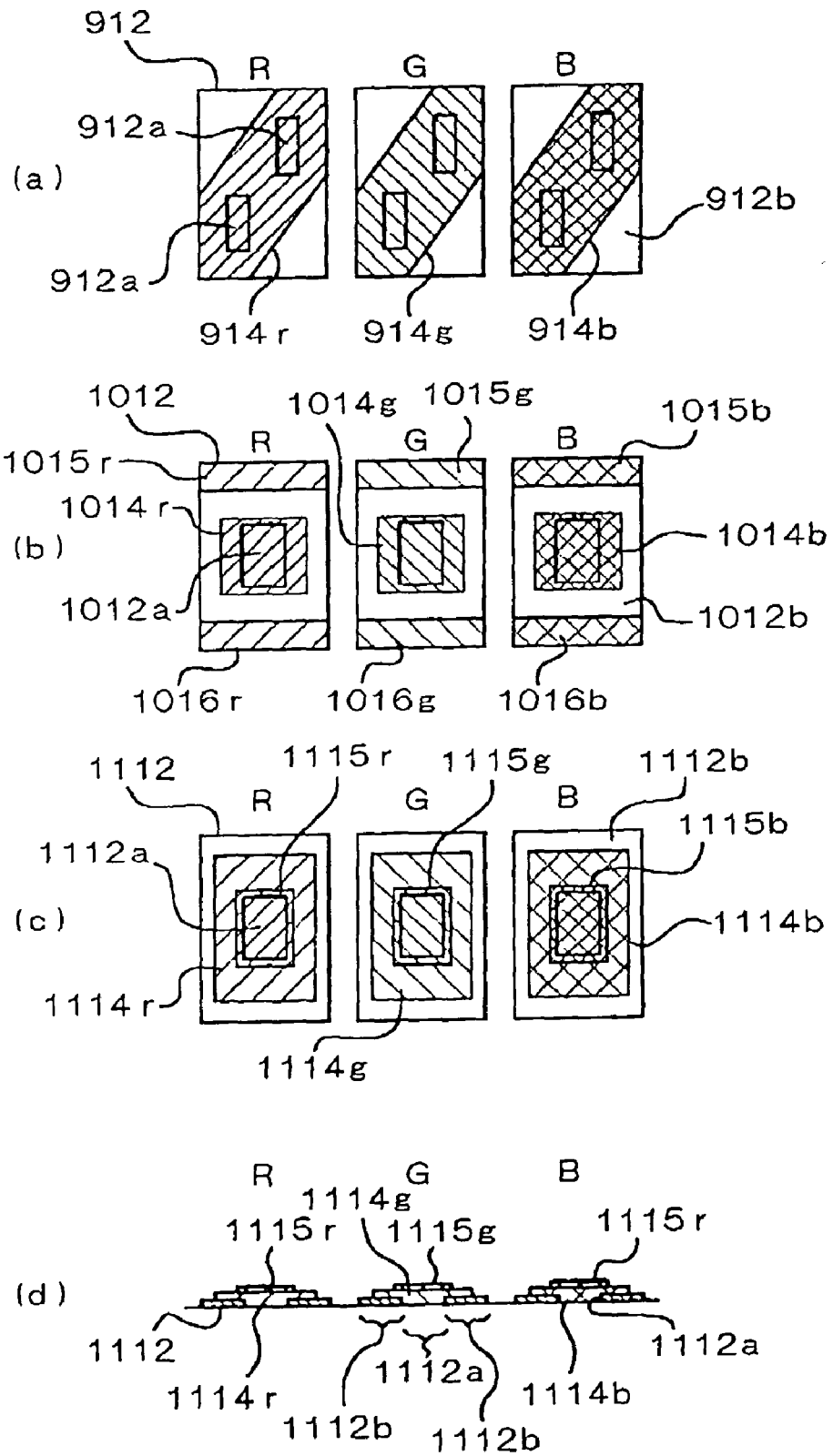
FIGS. 6(a) to 6(c) are diagrammatic illustration schematically showing an overlapping condition of a reflective layer and a colored layer according to other Configurations 5 to 7.

In Configuration 5 shown in FIG. 6(a), a plurality of apertures 912a (two apertures shown in the figure) are made in a reflective layer 912. A part other than the aperture 912a out of the reflective layer 912 forms a reflection part 912b substantially reflecting the light. Colored layers 914r, 914g and 914b overlapping this reflective layer 912 in the two-dimensional direction covers the plurality of apertures 912a, and overlap only a part of the reflection part 912b in the two-dimensional direction.

(Configuration 6)

In Configuration 6 shown in FIG. 6(b), a plurality of colored layers 1014r, 1014g, 1014b, 1015r, 1015g, 1015b, 1016r, 1016g, and 1016b (three shown in the figure) overlapping a reflective layer 1012 having an aperture 1012a and a reflection part 1012b in the two-dimensional direction are provided. The colored layers 1014r, 1014g and 1014b overlap the aperture 1012b in the two-dimensional direction, and the colored layers 1015r, 1015g, 1015b, 1016r, 1016g and 1016b overlap only a part of the reflection part. The colored layers 1014r, 1014g and 1014b are constituted so as to have the color concentration higher than that of the colored layers 1015r, 1015g, 1015b, 1016r, 1016g and 1016b, in other word, so as to contain coloring agent such as pigment and dye of higher concentration.

In Configuration 6, the light concentration of the colored layers 1014r, 1014g and 1014b overlapping the aperture 1012a in the two-dimensional direction is high, and the light concentration of the colored layers 1015r, 1015g, 1015b, 1016r, 1016g and 1016b overlapping only a part of the reflection part 1012b in the two-dimensional direction is low. Thus, in comparison with the above embodiments, the saturation of the transmitted light is relatively higher, and the brightness of the reflected light is further increased.

As described above, configuration in which the light concentration of the colored layer is partially different is not excluded in the present invention. In particular, for the colored layer, it is preferable to set the light concentration of the area overlapping an optical aperture of the reflective layer in the two-dimensional direction is set to be high and the light concentration of the area overlapping other reflective layer in the two-dimensional direction is set to be low.

(Configuration 7)

In Configuration 7 shown in FIG. 6(c), a plurality of colored layers 1114r, 1114g, 1114b, 1115r, 1115g, 1115b, 1116r, 1116g, and 1116b (two shown in the figure) overlapping a reflective layer 1112 having an aperture 1112a and a reflection part 1112b in the two-dimensional direction are provided. The colored layers 1114r, 1114g and 1114b and the colored layers 1115r, 1115g, 1115b are laminated on each other, or overlaps each other in the two-dimensional direction. FIG. 6(b) is a sectional view showing a case in which the reflective layer 1112, the colored layers 1114r, 1114g, 1114b, and the colored layers 1115r, 1115g and 1115b are laminated on each other in Configuration 7.

In Configuration 7, in an area in which the colored layers 1114r, 1114g, 1114b overlap the colored layers 1115r, 1115g and 1115b in the two-dimensional direction, i.e., in an area in which these colored layers overlap the aperture 1112a, the thickness of the colored layer is substantially large, while the thickness of the colored layers is substantially small in an area in which the colored layers 1114r, 1114g, 1114b are formed, but do not overlap the colored layers 1115r, 1115g and 1115b, i.e., in an area the colored layers overlap the reflection part 1112b in the two-dimensional direction. Thus, the saturation of the transmitted light is further improved by the thick colored layers, and the brightness of the reflected light is further improved by the partially formed thin colored layers.

As described above, configuration in which the colored layer is formed with the thickness partially changed is not excluded in the present invention. In particular, for the colored layer, it is preferable to set the thickness to be substantially large in the area in which the reflective layer overlaps the optical aperture in the two-dimensional direction, and substantially small in the area overlapping other reflective layer in the two-dimensional direction.

In order to improve the above effect, the color concentration of the colored layers 1115r, 1115g and 1115b overlapping the aperture 1112a in the two-dimensional direction may be set to be higher, and the color concentration of the colored layers 1114r, 1114g and 1114b expanding to an area overlapping a part of the reflection surface in the two-dimensional direction from an area overlapping the aperture 1012a in the two-dimensional direction may be set to be lower.

(Configuration 8)

Figure 7:
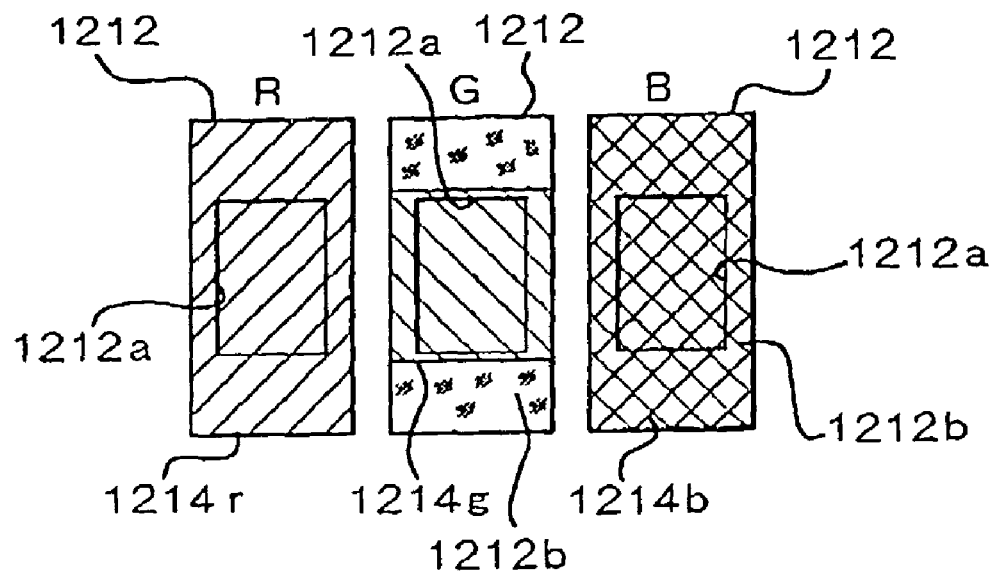
FIG. 7 is a diagrammatic illustration schematically showing the configuration of Configuration 8 according to the present invention.

FIG. 7 shows Configuration 8 schematically. In this Configuration 8, colored layers 1214r and 1214b are formed entirely over the reflective layer 1212 in R pixel and B pixel while a colored layer 1214g is formed in an overlapping manner only on a part of the reflective layer 1212 in G pixel. The colored layer 1214g covers the aperture 1212a entirely, and projected in an expanding manner to an aperture edge thereof, and the colored layer 1214g overlaps only a part of the reflection part 1212b thereby.

In Configuration 8, the aperture ratio of the reflective layer 1212 (the ratio of the area of the aperture 1212a to the total area of the reflective layer 1212) is 30-70% commonly to each of R, G and B pixels. The coverage area ratio of the G pixel (the ratio of the area of the colored layer 1214g to the area of the reflection part 1212b) is 40-80%.

In the above configuration, the saturation is ensured in R pixel and B pixel by setting the coverage area ratio (the ratio of the colored layer overlapping the reflection part 1212 to the area of the reflection part 1212, i.e., the reflection coloring ratio) of the colored layers 1214r and 1214b to the reflection part 1212b to be 100%, and the brightness is increased in G pixel by setting the coverage area ratio of the colored layer 1214g to the reflection part 1212b. The brightness of the reflective display can thus be increased without substantially degrading the saturation of R and B.

(Configuration 9)

Figure 8:
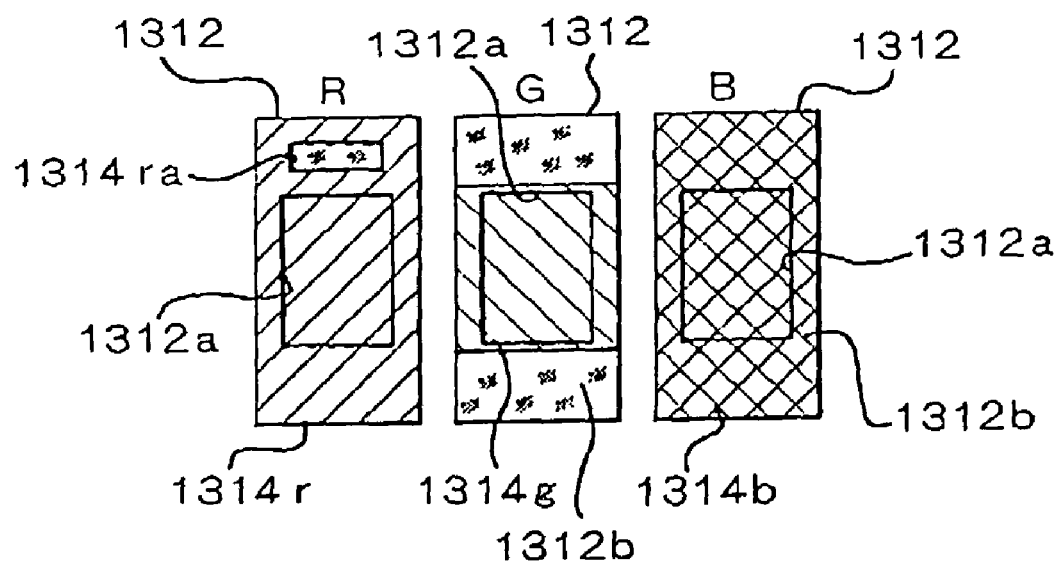
FIG. 8 is a diagrammatic illustration schematically showing the configuration of Configuration 9 according to the present invention.

FIG. 8 shows the configuration of Configuration 9 schematically. In Configuration 9, a colored layer 1314b fully covers a reflective layer 1312 in B pixel (with the coverage area ratio of 100%), and a colored layer 1314r has an aperture 1314ra for exposing a part of the reflective layer 1312 in R pixel. In addition, in G pixel, a colored layer 1314g completely overlaps the aperture 1312a of the reflective layer 1312 in an expanding manner to its periphery, and overlaps only a part of the reflection part 1312b.

In Configuration 9, the aperture ratio of the reflective layer 1312 is 30-70% commonly to the respective RGB pixels. The coverage area ratio of R pixel is 60-100% and the coverage area ratio of G pixel is 40-80%, respectively.

(Configuration 10)

Figure 9:
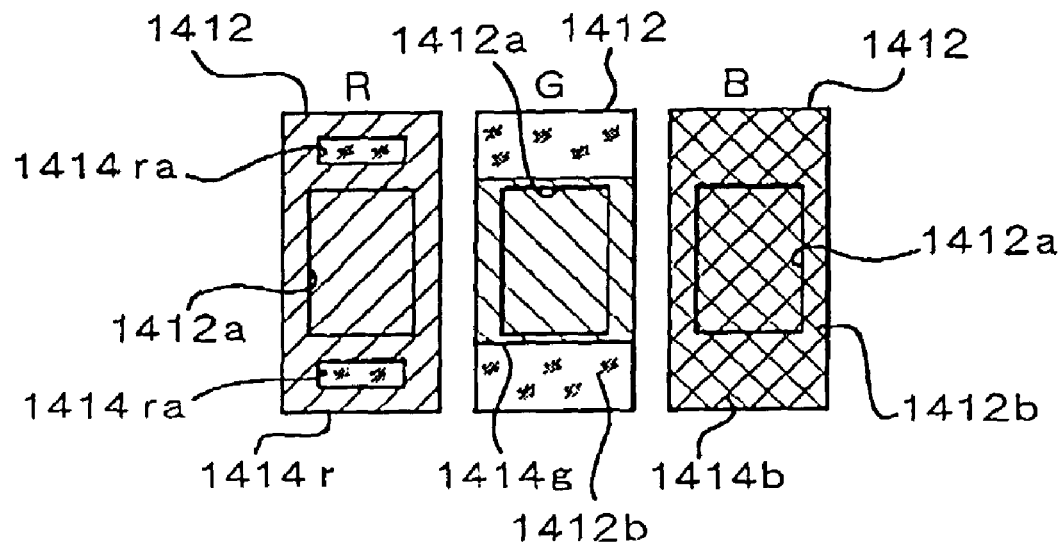
FIG. 9 is a diagrammatic illustration schematically showing the configuration of Configuration 10 according to the present invention.

FIG. 9 shows the configuration of Configuration 10 schematically. In Configuration 10, a colored layer 1414b fully covers a reflective layer 1412 in B pixel (with the coverage area ratio of 100%), and a colored layer 1414r has apertures 1414ra for exposing a part of the reflective layer 1412 in R pixel. In this Configuration, two apertures 1414ra are provided. In addition, in G pixel, a colored layer 1414g completely overlaps the aperture 1412a of the reflective layer 1412 in an expanding manner to its periphery, and overlaps only a part of the reflection part 1412b.

In Configuration 10, the aperture ratio of the reflective layer 1412 is 30-70% commonly to the respective RGB pixels. The coverage area ratio of R pixel is 60-100% and the coverage area ratio of G pixel is 40-80%, respectively.

(Configuration 11)

Figure 10:
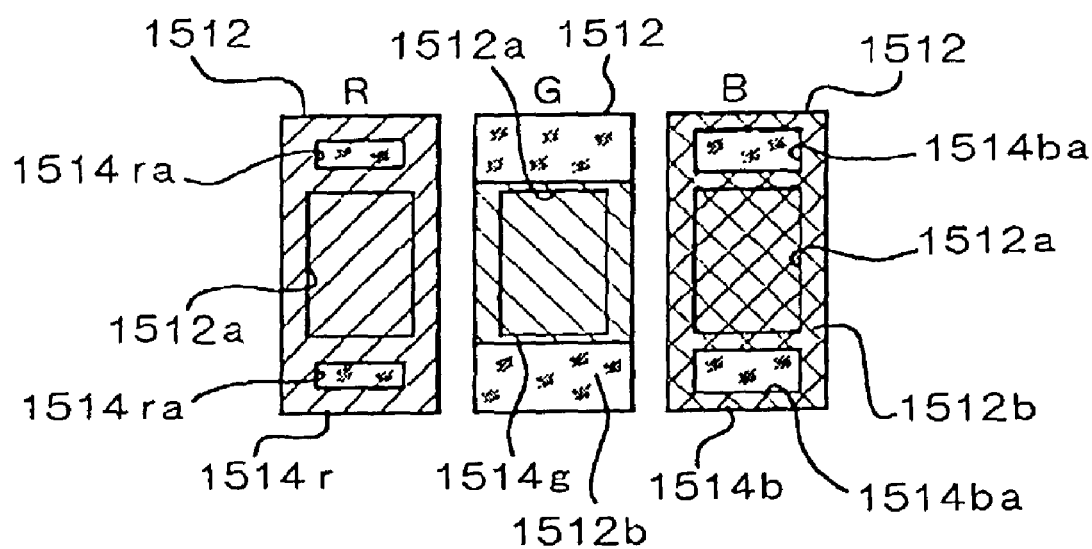
FIG. 10 is a diagrammatic illustration schematically showing the configuration of Configuration 11 according to the present invention.

FIG. 10 shows the configuration of Configuration 11 schematically. In Configuration 11, a colored layer 1514b has apertures 1514ba for exposing a part of the reflective layer 1512 in B pixel. In this Configuration, two apertures 1514ba are provided. A colored layer 1514r has apertures 1514ra for exposing a part of the reflective layer 1512 in R pixel. In this Configuration, two apertures 1514ra are provided. In addition, in G pixel, a colored layer 1514g completely overlaps the aperture 1512a of the reflective layer 1512 in an expanding manner to its periphery, and overlaps only a part of the reflection part 1512b.

In Configuration 11, the aperture ratio of the reflective layer 1512 is 30-70% commonly to the respective RGB pixels. The coverage area ratio of B pixel is 70-100%, the coverage area ratio of R pixel is 60-100%, and the coverage area ratio of G pixel is 40-80%, respectively.

(Configuration 12)

Figure 11:
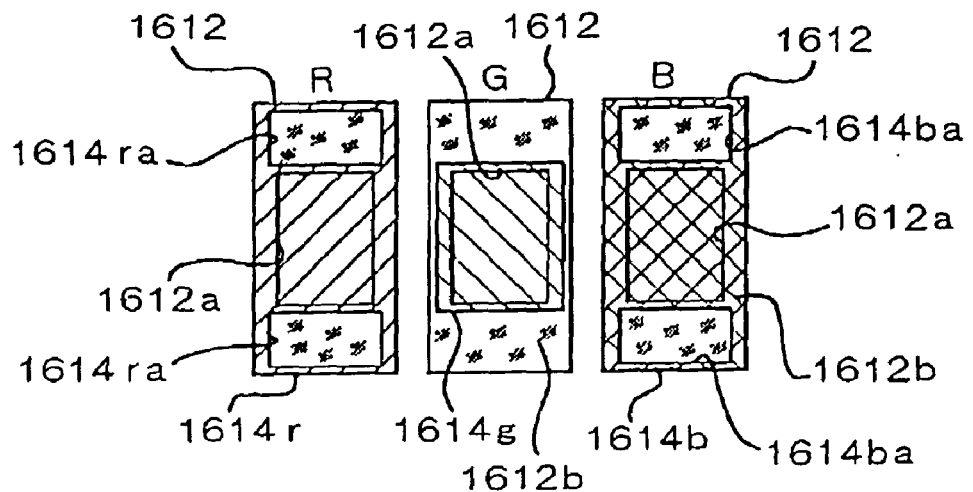
FIG. 11 is a diagrammatic illustration schematically showing the configuration of Configuration 12 according to the present invention.

FIG. 11 shows the configuration of Configuration 12 schematically. In Configuration 12, a colored layer 1614b has apertures 1614ba for exposing a part of the reflective layer 1612 in B pixel. In this Configuration, two apertures 1614ba are provided. A colored layer 1614r has apertures 1614ra for exposing a part of the reflective layer 1612 in R pixel. In this Configuration, two apertures 1614ra are provided. In addition, in G pixel, a colored layer 1614g completely overlaps the aperture 1612a of the reflective layer 1612 in an expanding manner to its periphery, and overlaps only a part of the reflection part 1612b.

In Configuration 12, the aperture ratio of the reflective layer 1612 is 30% commonly to the respective RGB pixels. The coverage area ratio of B pixel is 65.3%, the coverage area ratio of R pixel is 65.3%, and the coverage area ratio of G pixel is 30.2%, respectively.

(Configuration 13)

Figure 12:
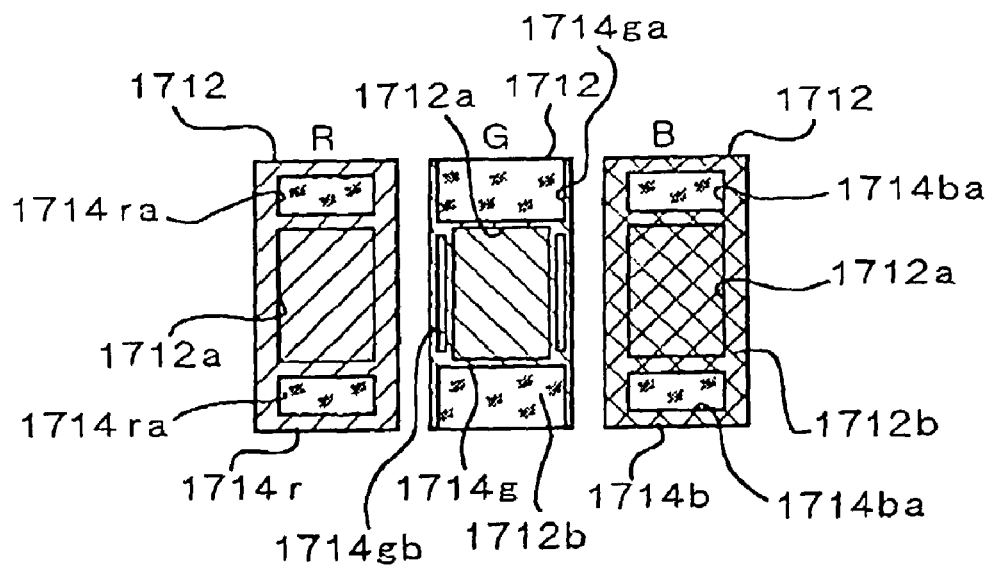
FIG. 12 is a diagrammatic illustration schematically showing the configuration of Configuration 13 according to the present invention.

FIG. 12 shows the configuration of Configuration 13 schematically. In Configuration 13, a colored layer 1714b has apertures 1714ba for exposing a part of the reflective layer 1712 in B pixel. In this Configuration, two apertures 1714ba are provided. A colored layer 1714r has apertures 1714ra for exposing a part of the reflective layer 1712 in R pixel. In this Configuration, two apertures 1714ra are provided. In addition, in G pixel, a colored layer 1714g completely overlaps the aperture 1712a of the reflective layer 1712 in an expanding manner to its periphery, and overlaps only a part of the reflection part 1712b.

In Configuration 13, the aperture ratio of the reflective layer 1712 is 30% commonly to the respective RGB pixels. The coverage area ratio of B pixel is 75.4%, the coverage area ratio of R pixel is 75.4%, and the coverage area ratio of G pixel is 40.2%, respectively.

(Configuration 14)

Figure 13:
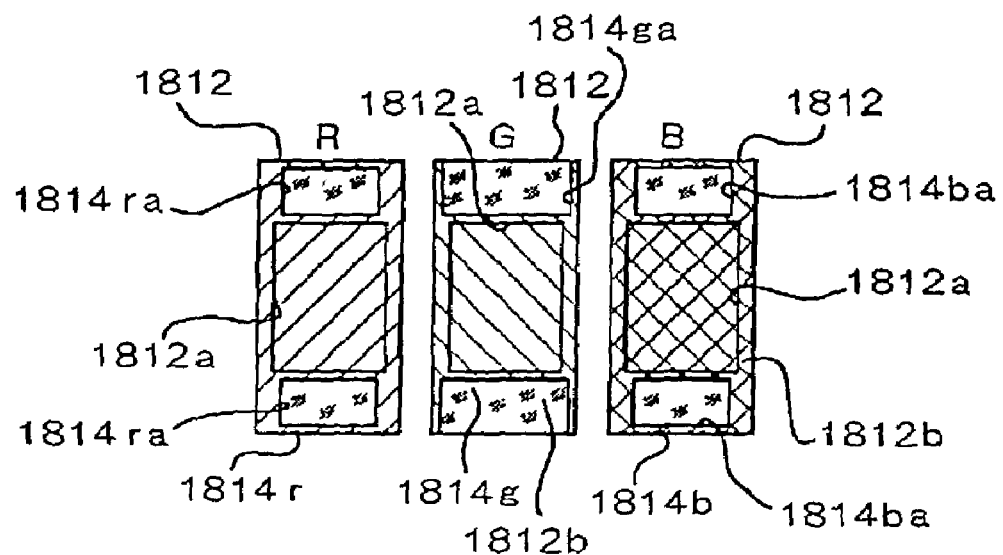
FIG. 13 is a diagrammatic illustration schematically showing the configuration of Configuration 14 according to the present invention.

FIG. 13 shows the configuration of Configuration 14 schematically. In Configuration 14, a colored layer 1814b has apertures 1814ba for exposing a part of the reflective layer 1812 in B pixel. In this Configuration, two apertures 1814ba are provided. A colored layer 1814r has apertures 1814ra for exposing a part of the reflective layer 1812 in R pixel. In this Configuration, two apertures 1814ra are provided. In addition, in G pixel, a colored layer 1814g completely overlaps the aperture 1812a of the reflective layer 1812 in an expanding manner to its periphery, and overlaps only a part of the reflection part 1812b.

In Configuration 14, the aperture ratio of the reflective layer 1812 is 50% commonly to the respective RGB pixels. The coverage area ratio of B pixel is 75.4%, the coverage area ratio of R pixel is 75.4%, and the coverage area ratio of G pixel is 47.7%, respectively.

(Configuration 15)

Figure 14:
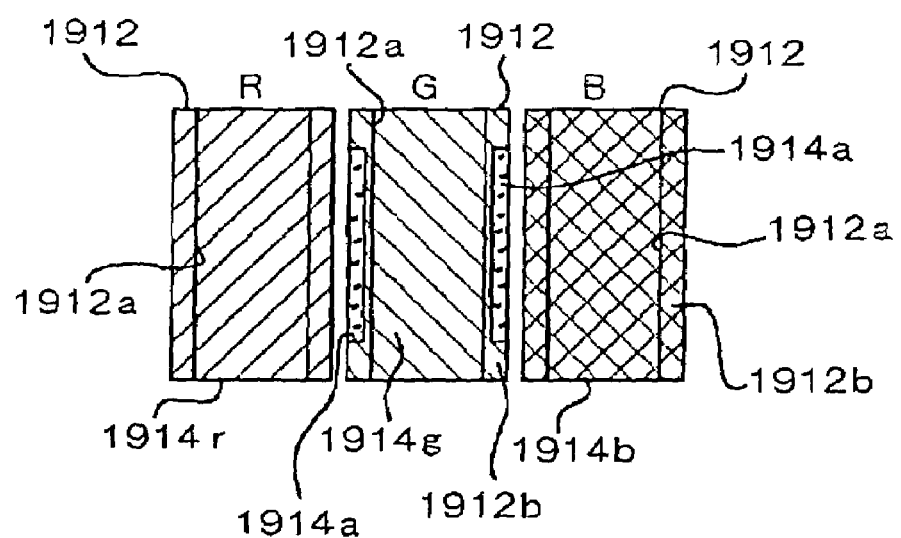
FIG. 14 is a diagrammatic illustration schematically showing the configuration of Configuration 15 according to the present invention.

FIG. 14 shows the configuration of Configuration 15 schematically. In Configuration 15, a reflective layer 1912 of each pixel is provided with a pair of right and left reflection parts 1912b separated therefrom, and an aperture 1912a is formed therebetween. In B and R pixels, colored layers 1914b and 1914r fully cover the reflective layer 1912. In addition, in G pixel, a colored layer 1914g completely overlaps the aperture 1912a of the reflective layer 1912 in an expanding manner to its periphery, and overlaps only a part of the reflection part 1912b. This means that the reflection part 1912b is partially exposed by an aperture 1914ga made in a colored layer 1914g.

In Configuration 15, the aperture ratio of the reflective layer 1912 is 70% commonly to the respective RGB pixels. The coverage area ratio of B pixel and R pixel is 100%, and the coverage area ratio of G pixel is 50.0%, respectively.

(Optical Characteristic)

Figure 15:
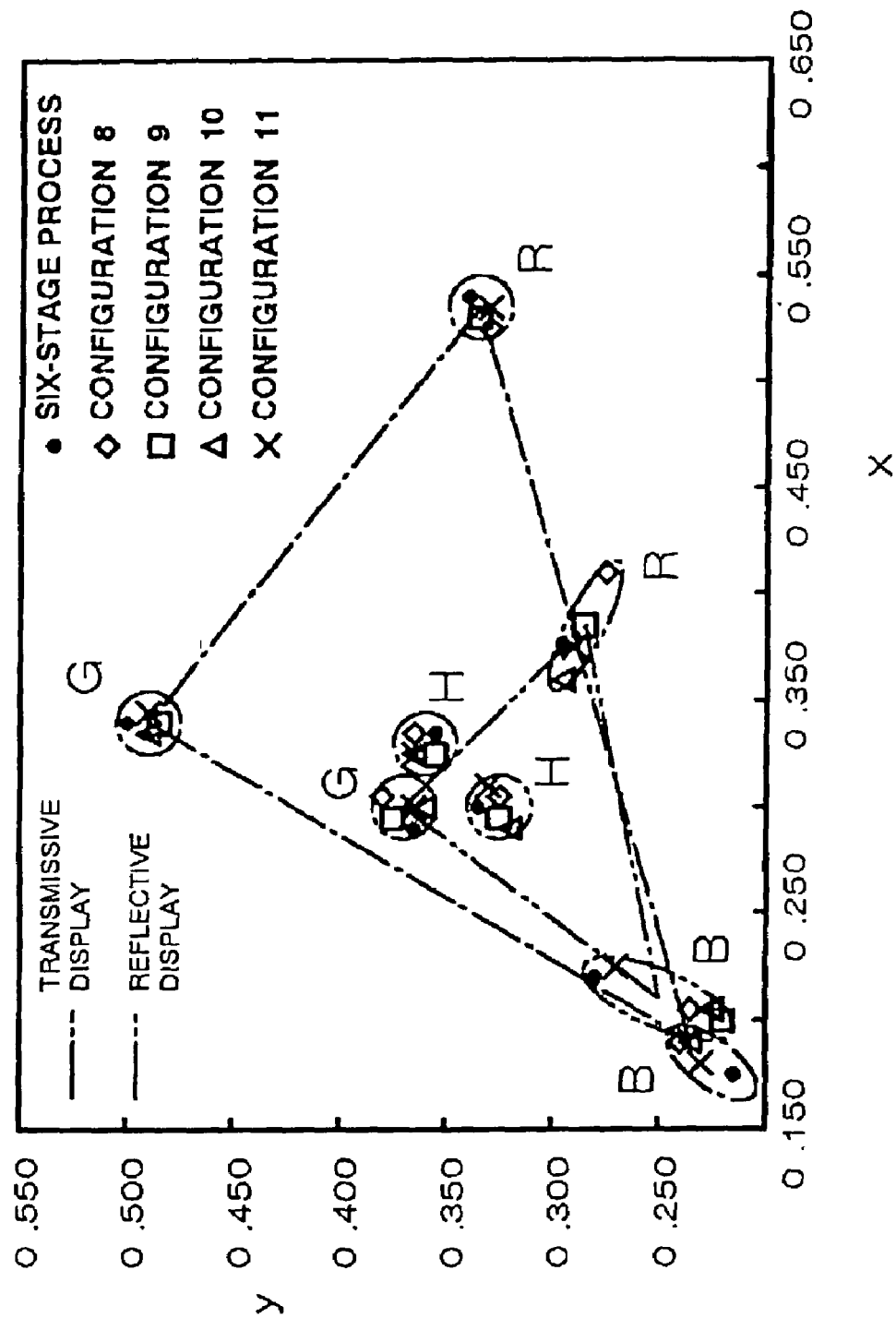
FIG. 15 is an xy chromaticity diagram showing comparison of color data in examples of comparison of a colored layer with a six-stage process of Configurations 8 to 11.
Figure 16:
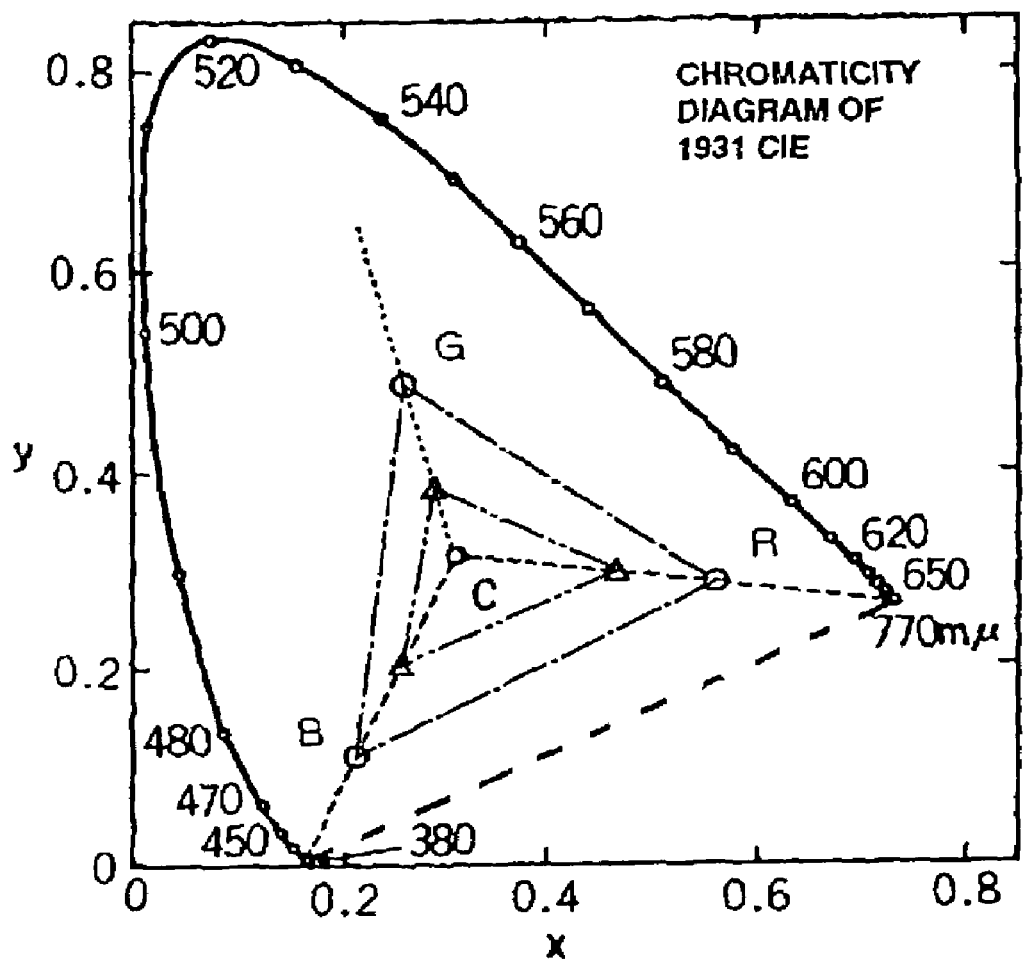
FIG. 16 is a chromaticity diagram of 1931 CIExyz standard colorimetric system.

Next, FIG. 15 shows the optical characteristic of the above Configurations 8 to 11. FIG. 15 shows the color data of the transmitted light and the reflected light of the RGB pixels of each Configuration described above in the xy chromaticity diagram of 1931 CIE xyz standard colorimetric system. Generally, in the xy chromaticity diagram, the tint actually and visibly recognized is arranged in a range of a temple bell shape with the tint (hue and saturation) of the single wavelength light in the visible light range as a boundary as shown in FIG. 16. When color display is performed by using a three-color (for example, RGB) colored layer, the tint in a triangle formed by connecting data points of each colored layer RGB can be formed. Basically, the quality of the color display is improved more as the area of the above triangle is increased.

FIG. 15 shows the color data of the transmissive display of the above Configurations 8 to 11 (data point surrounded by a one-dot chain line) and the color data of the reflective display (data point surrounded by a two-dot chain line). Symbols of diamond, square, triangle, and X denote the data points of Configuration 8, Configuration 9, Configuration 10 and Configuration 11, respectively. Numeral H in the figure denotes the data point of the white display.

In FIG. 15, the aperture ratio of the reflective layer is set to be 30% in comparison with the color data of the above configurations, a transmission part colored layer overlapping each aperture and a reflection part colored layer overlapping the reflection part are formed separately for each of RGB colors, measurement is performed for a case using a color filter substrate formed by a six-stage process for performing six patternings, and measurement is denoted by a black point in the figure as an example of comparison. FIG. 17(a) shows the spectral light transmittance ratio of the above transmission part colored layer, and FIG. 17(b) shows the spectral transmittance ratio of the above reflection part colored layer. In the transmission area (aperture), the light is transmitted through the transmission part colored layer only once, while in the reflection area (reflection part), the light is reciprocated, and transmitted through the reflection part colored layer twice, and the transmission part colored layer indicating the optical characteristic of relatively high saturation (with low average light transmittance ratio T) as shown in FIG. 17(a) is employed, and the reflection part colored layer indicating the optical characteristic of relatively low saturation but high average light transmittance ratio T as shown in FIG. 17(b) is employed. The brightness of the reflective display can be improved thereby while ensuring the saturation of transmissive display.

In Configurations 8 to 11 in accordance with the present invention, a colored layer presenting the same optical characteristic as that of the transmission part colored layer of an example of comparison in the above six-stage process, i.e., the spectral light transmittance ratio shown in FIG. 17(a), is used. As a result, the color quality of the reflective display close to that of the above example of comparison can be obtained as shown in FIG. 15. In particular, Configuration 11 has the hue and the saturation substantially equal to that of the example of comparison. Thus, in the present invention, the color quality equivalent to that of a case in which the optical characteristics of a filter part of the transmission area and the reflection area are separately set can be realized. For the above example of comparison, patterning twice for each color of RGB (for example, photolithography process) is not required, providing an advantage that the manufacturing cost can be reduced considerably.

As shown in the above Configurations 8 to 15, the areas of the aperture of the reflective layer are preferably equal to each other between the pixels having the colored layer of different color. This is because the areas of the aperture of the colored layer are set to be equal to each other between the pixels having different colors, the quantity of the incident light can be equal to each other in the pixel of each color, and the color of the transmissive display can be adjusted in a relatively easy manner. For example, the area of the aperture constituting the transmission area is equal to each other between the colors of RGB, the presenting mode of the color is similar to that of a transmissive display device, and thus, the optical characteristic of the color agent can be set for the colored layer of each of the colors of RGB by appropriate adjustment of the color agent of the color filter used for the transmissive display device as a reference. In addition, the area of the reflection part is set to be equal to each other between the pixels having the colored layer of different color, the area on the reflection part of the colored layer for each color can be easily adjusted when adjusting the color of the reflective display. For example, the area of the reflection part constituting the reflection area is equal to each other between each of the colors RGB, the color presenting mode is same as that of the reflective display device, and the coverage area ratio can be set by appropriate adjustment with the color filter used in the reflective display device as a reference.

In the above Configurations, the coverage area ratio of the reflection part of the colored layer is different from each other between the pixels having the colored layer of at least two different colors. Thus, the color of the reflective display can be optimized by adjusting the optical characteristic of the colored layer of each color so as to optimize the color of the transmissive display realized by the transmitted light through the aperture, and adjusting the coverage area ratio of the colored layer of each color overlapping the reflection part. Thus, the color of the transmissive display and the color of the reflective display can be adjusted independently for each color.

When having the colored layer of each of the colors RGB, the brightness can be improved while suppressing degradation of the saturation in the reflective display by setting the coverage area ratio of the green colored layer to be smaller than the coverage area ratio of the red and blue colored layers. The transmissive display is constituted by the light transmitted through the colored layer only once in the area overlapping the aperture. On the other hand, the reflective display is mainly constituted by the light transmitted through the colored layer two times in the area overlapping the reflection part, and also affected partially be the reflected light reflected by the part of the colored layer in the area overlapping the aperture, and generally, the reflective display is higher in saturation than the transmissive display while it is easily darkened. Thus, in the reflective display, the brightness must be increased even when the saturation is slightly degraded in the reflective display.

However, in particular, the specific luminous efficacy has a peak at the wavelength of 555 nm, green color and yellow color look brighter than blue color even when the optical energy is same, and the relationship between the saturation and the brightness is different for each color. For example, in order to increase the brightness of the colored layers of red (R pixel) and blue (B pixel), only one method practicable is to increase the light other than red and blue (the green light and yellow light of high specific luminous efficacy) unless the optical energy of the wavelength range of red and blue is increased considerably, and if the total optical quantity is limited, the saturation will be degraded considerably in such a manner worth improving the brightness. On the other hand, the saturation will not be degraded considerably even when the brightness is increased because the colored layer is not darkened even when the saturation is increased in a case of green (G pixel) mainly consisting of the light in the wavelength range of high specific luminous efficacy.

In the present invention, the saturation and the brightness in the reflective display are consistently realized by adjusting the coverage area ratio on the reflection part of the colored layer. In R pixel and B pixel, if the coverage area ratio is degraded considerably, the colored layer is brightened while the saturation is rapidly degraded, and thus, the coverage area ratio is preferably set to be as high as 60-100%. On the other hand, in G pixel, the light in the wavelength range of red and blue other than green is included in the reflected light by degrading the coverage area ratio in G pixel. Since there is a large difference in the specific luminous efficacy to other wavelength range, the saturation is not degraded as expected, and the coverage area ratio is preferably set to be as low as 35-50%. By setting the coverage area ratio of green and the coverage area ratio of red and blue in the above range, the color reproducibility of the reflective display and the brightness can be improved while ensuring the color reproducibility of the transmissive display.

In the above Configurations, the reflection part is disposed on the entire periphery of the aperture. This means that, in the reflective layer, the aperture is formed in a condition surrounded by the reflection part. Thus, even when there is a slight positional deviation between the colored layer and the reflective layer, any area not covered by the colored layer can be prevented from being generated in the aperture. In particular, the colored layer can be formed in an overlapping manner on the center part and its periphery of the reflective layer by forming the aperture substantially in a center of the reflective layer, the optical performance of the color filter is less easily affected by the patterning errors, etc., enabling consistent production.

The aperture ratio to the reflective layer by the aperture is preferably 30-70%. Generally, when the aperture ratio of the reflective layer is increased, the transmissive display becomes brighter while the reflective display is darkened, and the aperture ratio of the reflective layer must be set so as to take a balance between the transmissive display and the reflective display. More specifically, if the aperture ratio is too small, the illuminance of the backlight must be increased, and the power consumption of the backlight is increased. If the aperture ratio is too large, the reflective display is darkened, and less easily recognized visually. In the present embodiment, the brightness of the reflective display can be gained by providing an area not overlapping the colored layer in a part of the reflection part. The transmissive display and the reflective display can be balanced in the above range of large aperture ratio in comparison with a case employing a structure in which the colored layer overlaps the entire reflective layer, and excellent color quality can be realized in both the transmissive display and the reflective display. When the aperture ratio is below the above range, the power consumption is increased since the brightness of the transmissive display must be ensured, and this configuration is less easily employed in portable electronic apparatus such as cellular phones. When the aperture ratio exceeds the above range, the brightness and the saturation in the reflective display is less easily consistent, and the color quality in the reflective display is less easily ensured.

Figure 18:
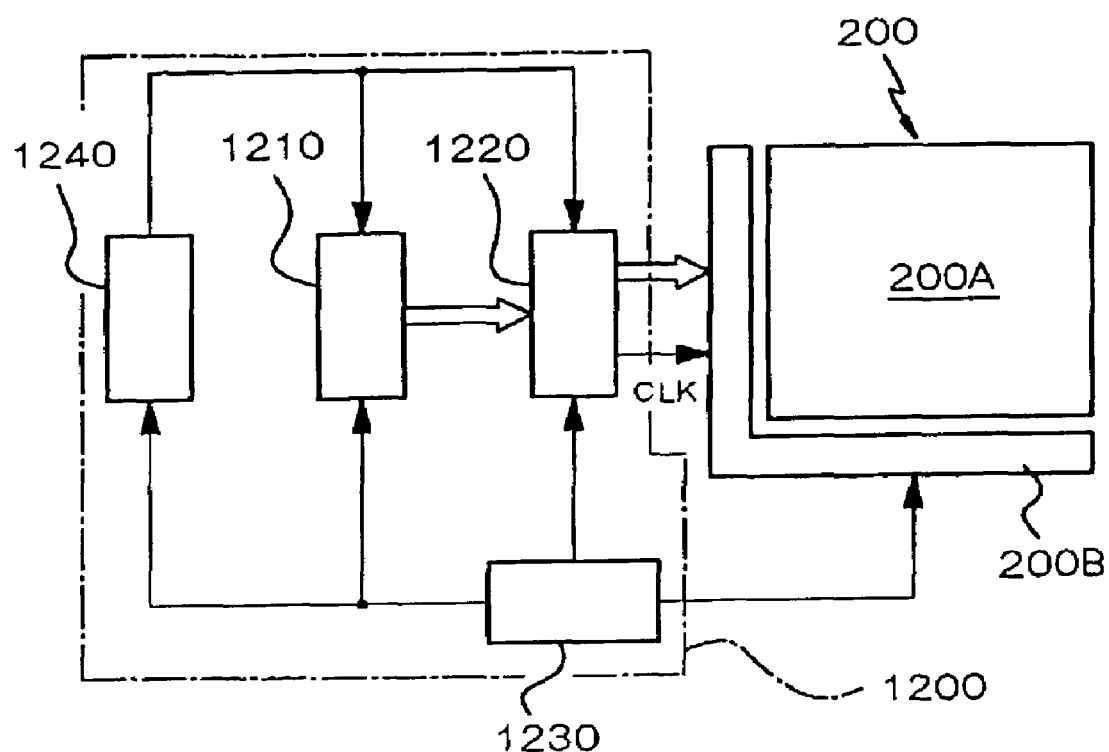
FIG. 18 is a schematic block diagram showing the block configuration of an embodiment of an electronic apparatus according to the present invention.

Description will be made on the embodiment in which an electro-optical device including the above liquid crystal display panel is used for a display device of an electronic apparatus. FIG. 18 is a diagrammatic illustration showing the overall configuration of the present embodiment. The electronic apparatus shown here comprises a liquid crystal display panel 200 similar to the above, and a control means 1200 for control the liquid crystal display panel. Here, the liquid crystal display panel 200 is illustrated conceptually and separately in a panel structure 200A and a drive circuit 200B comprising a semiconductor IC, etc. The control means 1200 comprises a display information output source 1210, a display processing circuit 1220, a power supply circuit 1220, and a timing generator 1240.

The display information output source 1210 comprises a memory comprising a ROM (Read Only Memory), a RAM (Random Access Memory), etc., a storage unit comprising a magnetic recording disk, an optical recording disk, etc., and a synchronous circuit for outputting the digital image signal in a synchronous manner, and supplies the display information to the display information processing circuit 1220 in the form of the image signal of a predetermined format based on various kinds of clock signals generated by the timing generator 1240.

The display information processing circuit 1220 comprises various kinds of known circuits such as a serial-parallel conversion circuit, an amplification and inverting circuit, a rotation circuit, a gamma correction circuit, and a clamp circuit, and performs the processing of the input display information, and supplies the image information to the drive circuit 200B together with the clock signal CLK. The drive circuit 200B includes a scanning line drive circuit, a data line drive circuit, and an inspection circuit. The power supply circuit 1230 supplies the predetermined voltage to each component described above.

Figure 19:
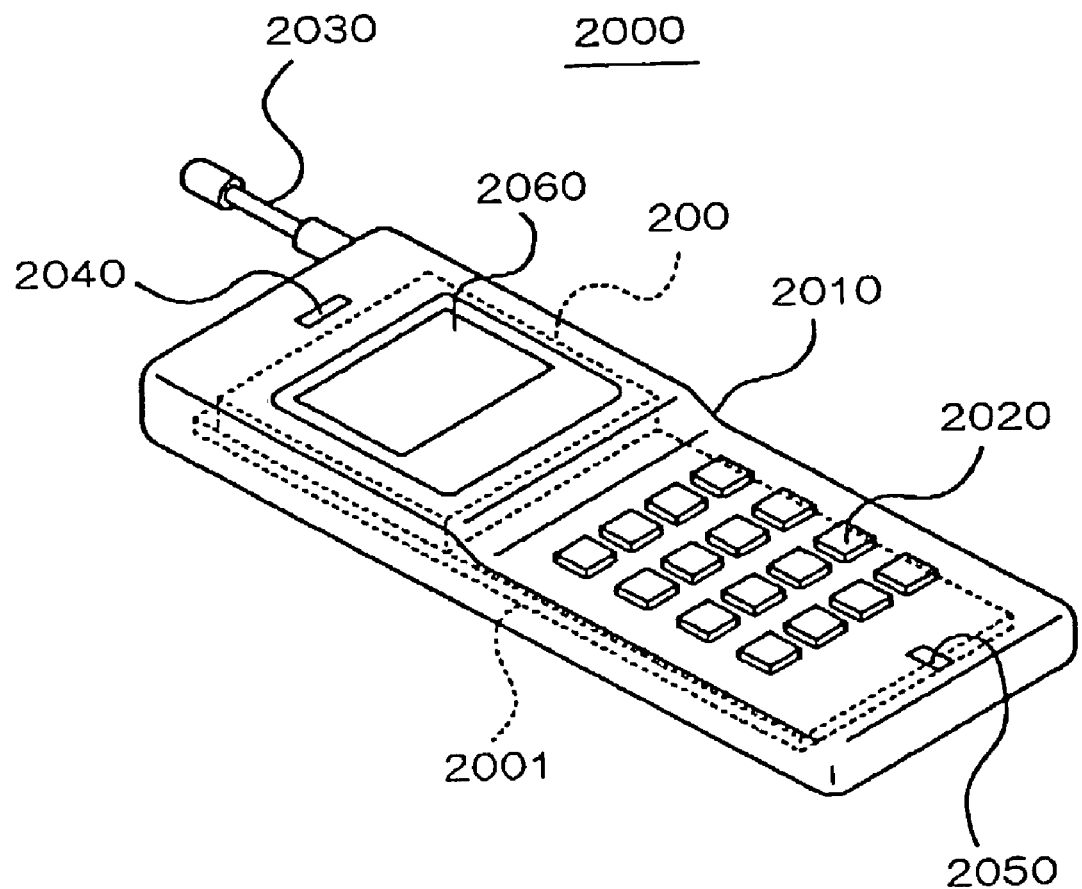
FIG. 19 is a schematic perspective view showing appearance of an embodiment of the electronic apparatus.
Figure 20:
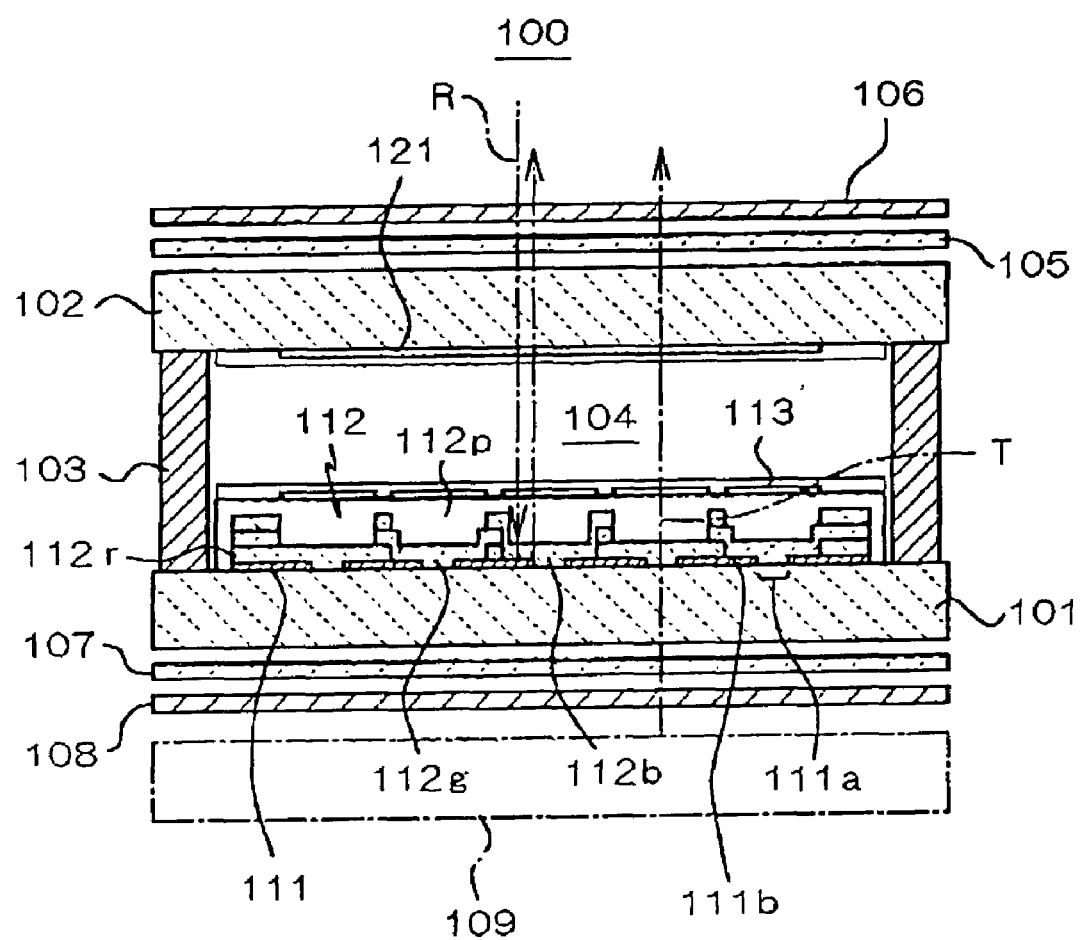
FIG. 20 is a schematic sectional view schematically showing a structure of a conventional transflective display type liquid crystal display panel.

FIG. 19 shows a cellular phone which is an embodiment of the electronic apparatus in accordance with the present invention. In this cellular phone 2000, a circuit board 2001 inside a casing 2010, and the above liquid crystal display panel 200 is mounted on this circuit board 2001. Operation buttons 2020 are arrayed on a front surface of the casing 2010, and an antenna 2030 is fitted from an end part in a retractable manner. A speaker is disposed inside a receiver part 2040, and a microphone is built inside a transmission unit 2050.

The liquid crystal display panel 200 installed in a casing 2010 is capable of visually recognizing a display surface (the above liquid crystal display area A) through a display window 2060.

The electro-optical device and the electronic apparatus of the present invention are not limited only to above examples shown in the above, but, needless to say, various kinds of modification can be added to the scope so that they do not deviate from the object of the present invention. For example, the liquid crystal display panel according to each embodiment described above has a simplified matrix type structure, and are also applicable to an active matrix type liquid crystal device using an active element such as a TFT (Thin Film Transistor) and a TFD (Thin Film Diode). In addition, the liquid crystal display panel according to the above embodiment has a so-called COG type structure, but any liquid crystal display panel having a structure with an IC chip directly mounted thereon, for example, with a flexible circuit board and a TAB substrate connected to the liquid crystal display panel may be acceptable.

In the above embodiment, description is made on the application of an electro-optical device to a liquid crystal device. The present invention is not limited thereto, but applicable to various kinds of electro-optical devices such as an electroluminescence device, in particular, an organic electroluminescence device and an inorganic electroluminescence device, a plasma display device, an FED (Field Emission Display) device, an LED (Light Emitting Diode) display device, an electrophoresis display device, a low profile CRT, a compact TV set using a liquid crystal shutter, etc., and a device using a digital micro-mirror device (DMD).

As described above, according to the present invention, the saturation of the transmissive display can be improved while ensuring the brightness of the reflective display. In addition, difference in color between the reflective display and the transmissive display can be reduced.

The entire disclosure of Japanese Patent Application Nos. 2001-228447 filed Jul. 27, 2001 and 2002-188602 filed Jun. 27, 2002 are expressly incorporated by reference herein.

What is claimed is:

1. An electro-optical device comprising:
   an electro-optical substance disposed between a pair of substrates;
   a first pixel including a first reflective display region and a first transmissive display region, the first transmissive display region being located in a portion of the first pixel where the first reflective display region is not located;
   a second pixel including a second reflective display region and a second transmissive display region, the second transmissive display region being located in a portion of the second pixel where the second reflective display region is not located;
   a first reflective layer disposed in th first reflective display region of the first pixel;
   a second reflective layer disposed in the second reflective display region of the second pixel;
   a first colored layer disposed between one of the pair of substrates and the electro-optical substance layer, the first colored layer being in an overlapping condition with both the first light transmitting region and the first reflective display region within the first pixel in plan view, the first colored layer being in a non-overlapping condition with a portion of the first light reflecting region within the first pixel in plan view; and
   a second colored layer disposed between one of the pair of substrates and the electro-optical substance layer, the second colored layer being in an overlapping condition with the entirety of the second pixel in plan view.

* * * * *